(12) United States Patent
Hasegawa

(10) Patent No.: US 6,700,756 B1
(45) Date of Patent: Mar. 2, 2004

(54) SPIN-VALVE THIN FILM MAGNETIC ELEMENT AND METHOD OF MANUFACTURING THE SAME

(75) Inventor: Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 365 days.

(21) Appl. No.: 09/586,507

(22) Filed: Jun. 2, 2000

(30) Foreign Application Priority Data

Jun. 3, 1999 (JP) ............................................. 11-157132

(51) Int. Cl.[7] ................................................. G11B 5/39
(52) U.S. Cl. ................................................. 360/324.12
(58) Field of Search ..................... 360/324.1, 324.11, 360/324.12

(56) References Cited

U.S. PATENT DOCUMENTS

| | | | |
|---|---|---|---|
| 5,159,513 A | | 10/1992 | Dieny et al. |
| 5,206,590 A | | 4/1993 | Dieny et al. |
| 5,373,238 A | | 12/1994 | McGuire et al. |
| 5,492,720 A | | 2/1996 | Gill et al. |
| 5,508,866 A | | 4/1996 | Gill et al. |
| 5,768,067 A | | 6/1998 | Saito et al. |
| 5,784,225 A | | 7/1998 | Saito et al. |
| 5,923,503 A | * | 7/1999 | Sato et al. .................. 360/327 |
| 5,949,623 A | * | 9/1999 | Lin ........................ 360/324.12 |
| 6,104,189 A | * | 8/2000 | Allenspach et al. ........ 324/252 |
| 6,295,186 B1 | * | 9/2001 | Hasegawa et al. ..... 360/324.11 |
| 6,307,722 B1 | * | 10/2001 | Sato et al. ............ 360/324.12 |
| 6,385,017 B1 | * | 5/2002 | Min et al. .............. 360/324.12 |
| 6,396,668 B1 | * | 5/2002 | Mao et al. .................. 360/314 |

* cited by examiner

*Primary Examiner*—David L. Ometz
(74) *Attorney, Agent, or Firm*—Brinks Hofer Gilson & Lione

(57) ABSTRACT

The present invention provides a spin-valve thin film magnetic element adaptable to high-density recording and having excellent heat resistance. The track width is defined by bias layers formed on flat portions of a free magnetic layer. The flat portions formed both sides of a track groove with no bias layer remaining in the groove. The spin-valve thin film magnetic element has an antiferromagnetic layer, a pinned magnetic layer, a nonmagnetic conductive layer, a free magnetic layer, bias layers, and conductive layers, which are formed on a substrate. The free magnetic layer forms the track groove on the side opposite to the pinned magnetic layer. The track groove has a width corresponding to the track width.

26 Claims, 16 Drawing Sheets

FIG. 1
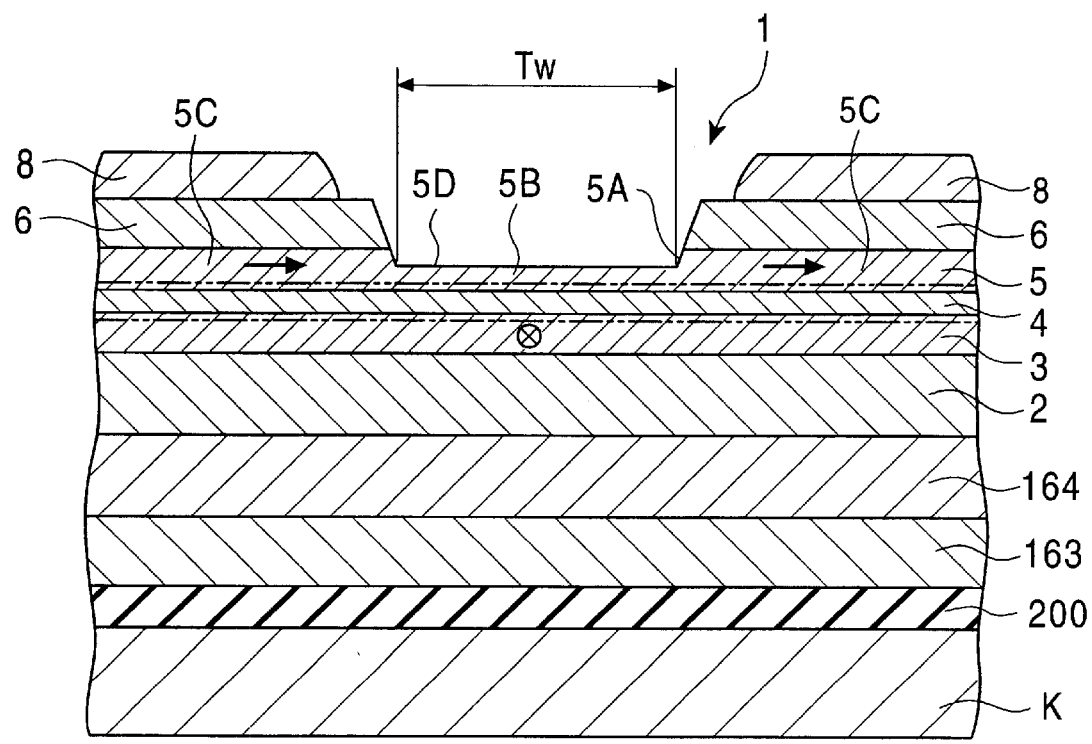
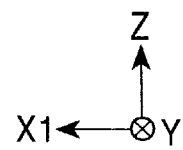

FIG. 14
PRIOR ART
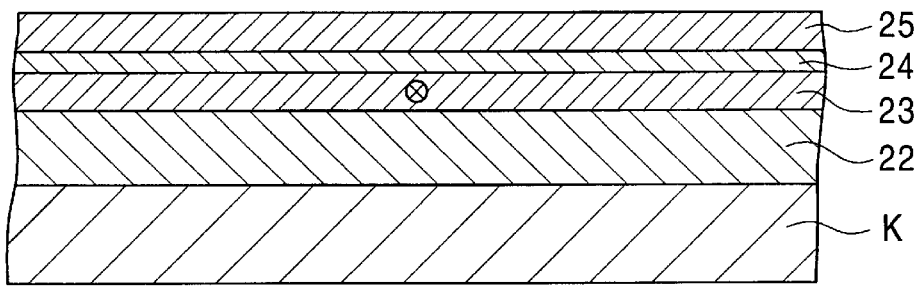
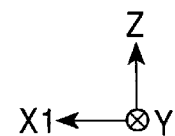
FIG. 15
PRIOR ART
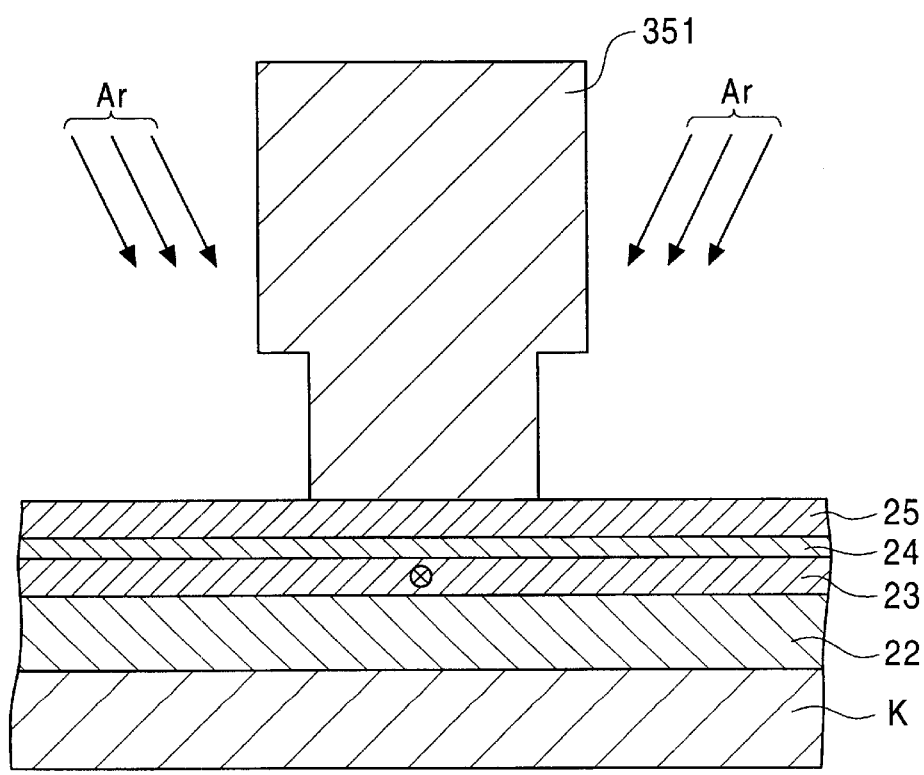
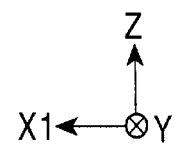

FIG. 19
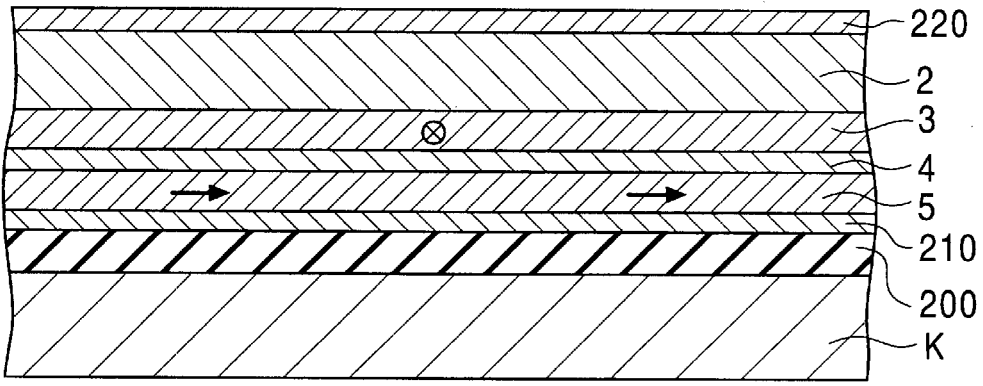
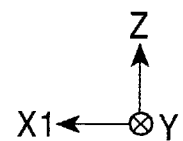
FIG. 20
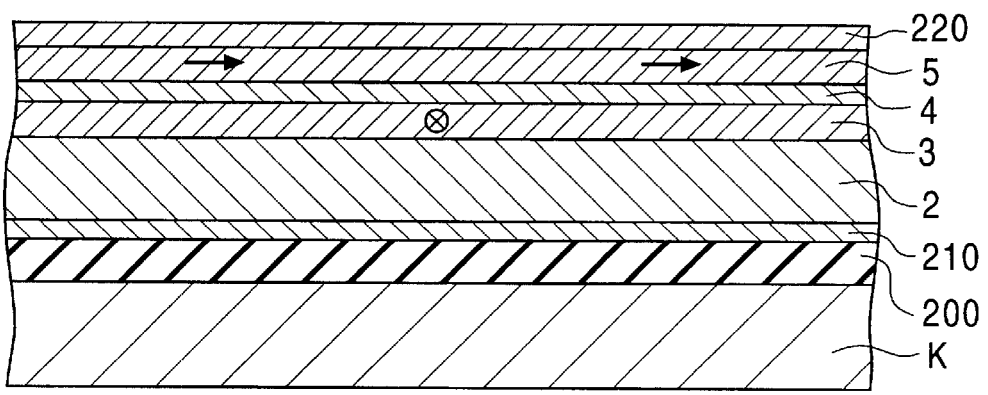
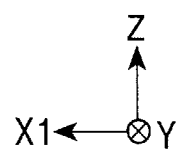

SPIN-VALVE THIN FILM MAGNETIC ELEMENT AND METHOD OF MANUFACTURING THE SAME

BACKGROUND OF THE INVENTION

1. Field of the Invention

The present invention relates to a spin-valve thin film magnetic element in which electric resistance is changed with the relation between the direction of pinned magnetization of a pinned magnetic layer and the magnetization direction of a free magnetic layer influenced by an external magnetic field. Particularly, the present invention relates to a spin-valve thin film magnetic element having excellent heat resistance, a thin film magnetic head comprising the spin-valve thin film magnetic element, and a method of manufacturing the spin-valve thin film magnetic element which is capable of easily crossing at right angles the magnetization direction of a free magnetic layer and the magnetization direction of a pinned magnetic layer.

2. Description of the Related Art

Magnetoresistive heads include an AMR (anisotropic magnetoresistive) head comprising an element exhibiting a magnetoresistive effect, and a GMR (giant magnetoresistive) head comprising an element exhibiting a giant magnetoresistive effect. The AMR head comprises an element exhibiting the magnetoresistive effect and having a single layer structure comprising a magnetic material. On the other hand, the GMR head comprises an element having a multilayer structure comprising a lamination of a plurality of materials. Although there are some types of structures that create the giant magnetoresistive effect, a spin-valve thin film magnetic element has a relatively simple structure and exhibits a high rate of change in resistance with a weak external magnetic field.

FIGS. 12 and 13 are sectional views respectively showing the structures of examples of conventional spin-valve thin film magnetic elements, as viewed from the surface side facing a recording medium.

In each of the examples, shield layers are formed above and below the spin-valve thin film magnetic element with gap layers provided therebetween. Namely, a reproducing GMR head comprises the spin-valve thin film element, the gap layers, and the shield layers. A recording inductive head may be mounted on the reproducing GMR head.

The GMR head is provided at the trailing side end of a floating slider together with the inductive head to form a thin film magnetic head, for detecting a recording magnetic field of a magnetic recording medium such as a hard disk or the like.

In FIGS. 12 and 13, the movement direction of the magnetic recording medium coincides with the Z direction shown in the drawings, and the direction of a leakage magnetic field from the magnetic recording medium coincides with the Y direction.

The spin-valve thin film magnetic element shown in FIG. 12 is a so-called bottom type single spin-valve thin film magnetic element comprising an antiferromagnetic layer, a pinned magnetic layer, a nonmagnetic conductive layer, and a free magnetic layer.

The spin-valve thin film magnetic element shown in FIG. 12 comprises a multilayer film 33 comprising a base layer 31, an antiferromagnetic layer 22, a pinned magnetic layer 23, a nonmagnetic conductive layer 24, a free magnetic layer 25 and a protecting layer 32, a pair of hard bias layers (permanent magnet layers) 29 formed on both sides of the multilayer film 33, and a pair of electrode layers 28 respectively formed on the hard bias layers 29.

Each of the base layer 31 and the protecting layer 32 comprises a Ta film or the like. The track width Tw is determined by the width dimension of the upper side of the multilayer film 33.

In general, the antiferromagnetic layer 22 comprises a Fe—Mn alloy film or a Ni—Mn alloy film, each of the pinned magnetic layer 23 and the free magnetic layer 25 comprises a Ni—Fe alloy film, the nonmagnetic conductive layer 24 comprises a Cu film, each of the hard bias layers 29 comprises a Co—Pt alloy film, and each of the electrode layers 28 comprises a Cr film, or a W film.

As shown in FIG. 12, magnetization of the pinned magnetic layer 23 is put into a single magnetic domain state in the Y direction (the direction of a leakage magnetic field from the recording medium: the height direction) due to an exchange anisotropic magnetic field with the antiferromagnetic layer 22, and magnetization of the free magnetic layer 25 is oriented in the direction opposite to the X1 direction due to the influence of a bias magnetic field from the hard bias layers 29.

Namely, the magnetization directions of the pinned magnetic layer 23 and the free magnetic layer 25 are set to cross at right angles.

In the spin-valve thin film magnetic element, a sensing current is supplied to the pinned magnetic layer 23, the nonmagnetic conductive layer 24 and the free magnetic layer 25 from the electrode layers 28 formed on the hard bias layers 29. The movement direction of the recording medium such as a hard disk or the like coincides with the Z direction. When a leakage magnetic field is applied from the recording medium in the Y direction, the magnetization direction of the free magnetic layer 25 is changed from the direction opposite to the X1 direction to the Y direction. In the free magnetic layer 25, the electric resistance is changed (referred to as a magnetoresistive effect) with the relation between the change in the magnetization direction and the pinned magnetization direction of the pinned magnetic layer 23 so that the leakage magnetic field from the recording medium is detected by a change in voltage based on the change in electric resistance.

The spin-valve thin film magnetic element shown in FIG. 13 is a so-called bottom type single spin-valve thin film magnetic element comprising an antiferromagnetic layer, a pinned magnetic layer, a nonmagnetic conductive layer, and a free magnetic layer.

In FIG. 13, reference character K denotes a substrate on which an antiferromagnetic layer 22 is formed. Furthermore, a pinned magnetic layer 23 is formed on the antiferromagnetic layer 22, a nonmagnetic conductive layer 24 is formed on the pinned magnetic layer 23, and a free magnetic layer 25 is formed on the nonmagnetic conductive layer 24.

Furthermore, bias layers 26 are formed on the free magnetic layer 25 with a space equal to the track width Tw therebetween, and conductive layers 28 are respectively provided on the bias layers 26.

The pinned magnetic layer 23 comprises, for example, a Co film, a NiFe alloy film, a CoNiFe alloy film, a CoFe alloy film, or the like.

The antiferromagnetic layer 22 is composed of NiMn.

Each of the bias layers 16 comprises an antiferromagnetic material such as a FeMn alloy having a face-centered cubic disordered crystal structure.

The pinned magnetic layer 23 shown in FIG. 13 is magnetized by an exchange anisotropic magnetic field produced in the interface with the antiferromagnetic layer 22 due to exchange coupling. The magnetization direction of the pinned magnetic layer 23 is pinned in the Y direction shown in the drawing, i.e., the direction away from the recording medium (the height direction).

The free magnetic layer 25 is magnetized by an exchange anisotropic magnetic field of the bias layers 26 to be put into a single magnetic domain state. The magnetization direction of the free magnetic layer 25 is oriented in the direction opposite to the X1 direction shown in the drawing, i.e., the direction crossing the magnetization direction of the pinned magnetic layer 23.

The free magnetic layer 25 is put into the single magnetic domain state by the exchange anisotropic magnetic field of the bias layers 26, thereby preventing the occurrence of Barkhausen noise.

In the spin-valve thin film magnetic element, when a stationary current is supplied to the free magnetic layer 25, the nonmagnetic conductive layer 24 and the pinned magnetic layer 23 from the conductive layers 28 to apply, in the Y direction shown in the drawing, a leakage magnetic field from the magnetic recording medium moved in the Z direction, the magnetization direction of the free magnetic layer 25 is changed from the direction opposite to the X1 direction to the Y direction. In the free magnetic layer 25, the electric resistance is changed with the relation between the change in the magnetization direction and the magnetization direction of the pinned magnetic layer 23 so that the leakage magnetic field from the recording medium is detected by a change in voltage based on the change in electric resistance.

In the spin-valve thin film magnetic element shown in FIG. 13, as shown in FIG. 14, the layers ranging from the antiferromagnetic layer 22 to the free magnetic layer 25 are formed, and then heat-treated (annealed) in a magnetic field to cause an exchange anisotropic magnetic field in the interface between the pinned magnetic layer 23 and the antiferromagnetic layer 22 so that the magnetization direction of the pinned magnetic layer 23 is pinned in the Y direction shown in the drawing. Then, as shown in FIG. 15, a lift off resist 351 having a width corresponding to the track width is formed. Then, the bias layers 26 and the conductive layers 28 are formed on the portions of the surface of the free magnetic layer 25, which are not covered with the lift off resist 351. After the lift off resist 351 is removed, the magnetization direction of the free magnetic layer 25 is oriented in the direction of the track width to produce the spin-valve thin film magnetic element shown in FIG. 13.

However, the conventional spin-valve thin film magnetic element shown in FIG. 12 has the following problems.

Although magnetization of the pinned magnetic layer 23 is magnetized in the Y direction to be brought into the single magnetic domain state, the hard bias layers 29 magnetized in the direction opposite to the X1 direction are provided on both sides of the pinned magnetic layer 23, and thus, particularly, the magnetization directions on both sides of the pinned magnetic layer 23 are not pinned in the Y direction due to the influence of the biased magnetic field from the hard bias layers 29.

Namely, the magnetization direction of the free magnetic layer 25, which is put into the single magnetic domain state in the direction opposite to the X1 direction by magnetization of the hard bias layers 29 in the direction opposite to the X1 direction, is not perpendicular to the magnetization direction of the pinned magnetic layer 23, particularly, near the side ends of the multilayer film 33. A reason for crossing the magnetization directions of the free magnetic layer 25 and the pinned magnetic layer 23 at right angles is that magnetization of the free magnetic layer 25 can be easily changed even by a small external magnetic field to greatly change the electric resistance, thereby improving reproduction sensitivity. Another reason is that an output waveform having good symmetry can be obtained.

Furthermore, since magnetization in the vicinities of the side ends of the free magnetic layer 25 is easily pinned by the influence of strong magnetization of the hard bias layers 29, the magnetization is less changed by an external magnetic field. Therefore, dead regions with low reproduction sensitivity are formed near the side ends of the multilayer film 33, as shown in FIG. 12.

In the multilayer film 33, the central region except the dead regions is a sensitive region which substantially contributes to reproduction from the recording medium and which exhibits the magnetoresistive effect. The width of the sensitive region is shorter than the track width Tw, which is set in forming the multilayer film 33, by a length corresponding to the width dimensions of the dead regions, and the track width Tw cannot be precisely defined due to variations in the dead regions. There is thus the problem of causing difficulties in complying with an increase in recording density by narrowing the track width Tw.

In the spin-valve thin film magnetic element shown in FIG. 13, the magnetization direction of the free magnetic layer 25 is oriented in the direction crossing the magnetization direction of the pinned magnetic layer 23 by an exchange bias system using the bias layers 26 comprising an antiferromagnetic material.

The exchange bias system is a system suitable for high-density recording with the narrow track width Tw, as compared with a hard bias system, which is difficult to control the effective track width Tw due to the presence of the dead regions.

However, the spin-valve thin film magnetic element shown in FIG. 13 has a problem of corrosion resistance because the antiferromagnetic layer 22 comprises a Ni—Mn alloy. A spin-valve thin film magnetic element comprising the antiferromagnetic layer 22 comprising a Ni—Mn alloy or Fe—Mn alloy also has a problem in which it is corroded with a weak alkali solution or an emulsifier containing sodium tripolyphosphate used in the process for manufacturing a thin film magnetic head to decrease the exchange anisotropic magnetic field.

Since the antiferromagnetic layer 22 comprises a Ni—Mn alloy, the antiferromagnetic layer used for the bias layers 26 is limited, thereby causing the problem of deteriorating the heat resistance and corrosion resistance of the bias layers 26. Namely, in order to form the bias layers 26 having high heat resistance, it is necessary to select an antiferromagnetic material such as a Ni—Mn alloy or the like which can produce an exchange anisotropic magnetic field in the direction opposite to the X1 direction in the interfaces between the bias layers 26 and the free magnetic layer 25 in heat treatment in a magnetic field in the direction crossing the exchange anisotropic magnetic field in the Y direction, which is produced in the interface between the antiferromagnetic layer 22 made of a Ni—Mn alloy and the pinned magnetic layer 23.

However, in heat treatment in the magnetic field, the exchange anisotropic magnetic field acting in the interface between the antiferromagnetic layer 22 and the pinned magnetic layer 23 is inclined from the Y direction to the direction opposite to the X1 direction, and thus the magnetization direction of the pinned magnetic layer 23 is not perpendicular to the magnetization direction of the free magnetic layer 25. There is thus a problem in that a symmetric output signal waveform cannot be obtained.

Therefore, it is necessary to select an antiferromagnetic material which requires no heat treatment in a magnetic field, and which produces an exchange anisotropic magnetic field immediately after film deposition in the magnetic field.

For these reasons, the bias layers 26 are generally made of a FeMn alloy having a face-centered cubic disordered crystal structure.

However, in a magnetic recording apparatus, the temperature of the element is increased due to a temperature raise in the apparatus and Joule heat generated by the sensing current to decrease the exchange anisotropic magnetic field, thereby causing difficulties in bringing the free magnetic layer 25 in the single magnetic domain state. As a result, the problem of causing Barkhausen noise is brought about.

Furthermore, a Fe—Mn alloy has lower corrosion resistance than a Ni—Mn alloy, and thus has not only a problem in which it is corroded with a weak alkali solution or emulsifier containing sodium tripolyphosphate used in the process for manufacturing a thin film magnetic head to decrease the exchange anisotropic magnetic field, but also a problem in which corrosion proceeds in the magnetic recording apparatus to deteriorate durability.

The method of manufacturing the conventional spin-valve thin film magnetic element shown in FIGS. 14 to 16 comprises the step of forming the lift off resist 351 shown in FIG. 15 in which the surface of the uppermost layer formed between the substrate and the bias layers is exposed to air. Thus, the surface exposed to air must be cleaned by ion milling or reverse sputtering with a rare gas such as Ar or the like before an upper layer is formed. This cleaning increases the number of manufacturing steps. Furthermore, there are problems with cleaning by ion milling or reverse sputtering such as contamination with materials (which adhere to the surface), the adverse effect of a disordered surface crystal state on the occurrence of the exchange anisotropic magnetic field, and other difficulties.

In the method of manufacturing the conventional spin-valve thin film magnetic element, the track width Tw is defined by the bias layers 26 and the electrode layers 28 provided on both sides of the lift off resist 351, thereby causing variation in the track width Tw due to variation in the dimensions of the base end of the lift off resist 351.

SUMMARY OF THE INVENTION

The present invention has been achieved for solving the above-described problem, and an object of the present invention is to provide a spin-valve thin film magnetic element adaptable to high-density recording, in which the track width can be precisely defined by bias layers provided on flat portions of a free magnetic layer on both sides of a groove with no bias layer remaining in the groove in manufacturing the spin-valve thin film magnetic element.

Another object of the present invention is to provide a spin-valve thin film magnetic element in which materials of an antiferromagnetic layer and bias layers are improved to improve heat resistance.

A further object of the present invention is to provide a method of manufacturing the above-described spin-valve thin film magnetic element, in which the magnetization direction of a free magnetic layer and the magnetization direction of a pinned magnetic layer can easily be crossed at right angles.

A further object of the present invention is to provide a thin film magnetic head comprising the above-described spin-valve thin film magnetic element, having excellent durability and heat resistance, and producing a sufficient exchange anisotropic magnetic field.

In order to achieve the objects, the present invention comprises the following construction.

A spin-valve thin film magnetic element of the present invention comprises an antiferromagnetic layer, a pinned magnetic layer formed in contact with the antiferromagnetic layer so that the magnetization direction is pinned by an exchange anisotropic magnetic field with the antiferromagnetic layer, a nonmagnetic conductive layer formed between the pinned magnetic layer and a free magnetic layer, bias layers for orienting the magnetization direction of the free magnetic layer in the direction perpendicular to the magnetization direction of the pinned magnetic layer, and conductive layers for supplying a sensing current to the free magnetic layer, wherein the free magnetic layer comprises a track groove provided on the side opposite to the pinned magnetic layer side and having a width corresponding to the track width, and flat portions on both sides of the groove, and the bias layers are provided on the flat portions of the free magnetic layer.

While the arrangement of the layers has been described in a preferred embodiment, they may be operatively connected in other fashions as long as the required electrical, mechanical, and magnetic properties of a spin valve are achieved. They may have one or more additional layers between any or all of them.

In the spin-valve thin film magnetic element, since the free magnetic layer comprises the groove provided on the side opposite to the pinned magnetic layer side and having a width corresponding to the track width, the track width can be precisely determined according to the width of the groove.

In manufacturing the spin-valve thin film magnetic element, the bias layers provided on the flat portions of the free magnetic layer on both sides of the groove do not remain in the groove, and the magnetic moment of the free magnetic layer is smoothly rotated with a weak leakage magnetic field from a magnetic recording medium, thereby improving sensitivity.

Each of the antiferromagnetic layer and the bias layers is preferably composed of an alloy containing Mn, and at least one element of Pt, Pd, Rh, Ru, Ir, Os, Au, Ag, Cr, Ni, Ne, Ar, Xe, and Kr.

The spin-valve thin film magnetic element comprises the antiferromagnetic layer and the bias layers each composed of the above alloy, and thus exhibits good temperature characteristics of the exchange anisotropic magnetic field and excellent heat resistance.

The spin-valve thin film magnetic element also exhibits excellent durability when provided in a hard disk in which the element is heated to high temperature by the environmental temperature in the device, and Joule heat generated by a sensing current flowing in the element, and the exchange anisotropic magnetic field (exchange coupling magnetic field) less changes with a temperature change.

Furthermore, since the antiferromagnetic layer is made of the above alloy to increase the blocking temperature, a high exchange anisotropic magnetic field can be produced in the antiferromagnetic layer, and the magnetization direction of the pinned magnetic layer can be strongly pinned.

In the spin-valve thin film magnetic element, at least one of the pinned magnetic layer and the free magnetic layer may be divided into two parts with a nonmagnetic intermediate layer provided therebetween so that the divided magnetic layers are brought into a ferrimagnetic state in which the magnetization directions are 180° different.

In the spin-valve thin film magnetic element in which at least the pinned magnetic layer is divided into two parts with the nonmagnetic intermediate layer provided therebetween, one of the two divided pinned magnetic layers functions to pin the other pinned magnetic layer in a proper direction, maintaining the pinned magnetic layers in a very stable state.

On the other hand, in the spin-valve thin film magnetic element in which at least the free magnetic layer is divided into two parts with the nonmagnetic intermediate layer provided therebetween, an exchange anisotropic magnetic field is produced between the two divided free magnetic layers to bring the free magnetic layers into a ferrimagnetic state, thereby permitting reversal with high sensitivity to an external magnetic field.

In the spin-valve thin film magnetic element, the antiferromagnetic layer is preferably made of an alloy represented by the following composition formula:

$$X_m Mn_{100-m}$$

wherein X is at least one element of Pt. Pd, Rh, Ru, Ir, and Os, and the composition ratio m satisfies 48 atomic %≤m≤60 atomic %.

The antiferromagnetic layer is preferably made of an alloy represented by the following composition formula:

$$X_m Mn_{100-m}$$

wherein X is at least one element of Pt, Pd, Rh, Ru, Ir, and Os, and the composition ratio m satisfies 48 atomic %≤m≤58 atomic %.

In the spin-valve thin film magnetic element, the bias layers are preferably made of an alloy represented by the following composition formula:

$$X_m Mn_{100-m}$$

wherein X is at least one element of Pt, Pd, Rh, Ru, Ir, and Os, and the composition ratio m satisfies 52 atomic %≤m≤60 atomic %.

In the spin-valve thin film magnetic element, the antiferromagnetic layer may be made of an alloy represented by the following composition formula:

$$Pt_m Mn_{100-m-n} Z_n$$

wherein Z is at least one element of Pd, Rh, Ru, Ir, and Os, and the composition ratios m and n satisfy 48 atomic %≤m+n≤60 atomic %, and 0.2 atomic %≤n≤40 atomic %.

More preferably, the composition ratios m and n satisfy 48 atomic %≤m+n≤58 atomic %, and 0.2 atomic %≤n≤40 atomic %.

In the spin-valve thin film magnetic element, the bias layers may be made of an alloy represented by the following composition formula:

$$Pt_m Mn_{100-m-n} Z_n$$

wherein Z is at least one element of Pd, Rh, Ru, Ir, and Os, and the composition ratios m and n satisfy 52 atomic %≤m+n≤60 atomic %, and 0.2 atomic %≤n≤40 atomic %.

In the spin-valve thin film magnetic element, the antiferromagnetic layer may be made of an alloy represented by the following composition formula:

$$Pt_q Mn_{100-q-j} L_j$$

wherein L is at least one element of Au, Ag, Cr, Ni, Ne, Ar, Xe, and Kr, and the composition ratios q and j satisfy 48 atomic %≤q+j≤60 atomic %, and 0.2 atomic %≤j≤10 atomic %.

More preferably, the composition ratios q and j satisfy 48 atomic %≤q+j≤58 atomic %, and 0.2 atomic %≤j≤10 atomic %.

In the spin-valve thin film magnetic element, the bias layers may be made of an alloy represented by the following composition formula:

$$Pt_q Mn_{100-q-j} L_j$$

wherein L is at least one element of Au, Ag, Cr, Ni, Ne, Ar, Xe, and Kr, and the composition ratios q and j satisfy 52 atomic %≤q+j≤60 atomic %, and 0.2 atomic %≤j≤10 atomic %.

Particularly, in the spin-valve thin film magnetic element comprising the antiferromagnetic layer and the bias layers having the same alloy composition, the following combinations 1 to 3 are preferred.

1. The antiferromagnetic layer and the bias layers preferably comprise an alloy having the following composition:

$$X_m Mn_{100-m}$$

wherein X is at least one element of Pt, Pd, Rh, Ru, Ir, and Os, and the composition ratio m satisfies 52 atomic %≤m≤58 atomic %.

The composition ratio m of the antiferromagnetic layer and the bias layers more preferably satisfies 52 atomic %≤m≤56.5 atomic %.

2. The antiferromagnetic layer and the bias layers preferably comprise an alloy having the following composition:

$$Pt_q Mn_{100-q-j} L_j$$

wherein L is at least one element of Au, Ag, Cr, Ni, Ne, Ar, Xe, and Kr, and the composition ratios q and j satisfy 52 atomic %≤q+j≤58 atomic %, and 0.2 atomic %≤j≤10 atomic %.

The composition ratios q and j of the antiferromagnetic layer and the bias layers more preferably satisfy 52 atomic %≤q+j≤56.5 atomic %, and 0.2 atomic %≤j≤10 atomic %.

3. The antiferromagnetic layer and the bias layers preferably comprise an alloy having the following composition:

$$Pt_m Mn_{100-m-n} Z_n$$

wherein Z is at least one element of Pd, Rh, Ru, Ir, and Os, and the composition ratios m and n satisfy 52 atomic %≤m+n≤58 atomic %, and 0.2 atomic %≤n≤40 atomic %.

The composition ratios m and n of the antiferromagnetic layer and the bias layers more preferably satisfy 52 atomic %≤m+n≤56.5 atomic %, and 0.2 atomic %≤n≤40 atomic %.

Where the antiferromagnetic layer and the bias layers have different alloy compositions, the following combinations 4 to 6 are preferred.

4. The bias layers preferably comprise an alloy represented by the composition $X_m Mn_{100-m}$ wherein X is at least one element of Pt, Pd, Ir, Rh, Ru, and Os, and the composition ratio m satisfies 52 atomic %≤m≤60 atomic %, and the antiferromagnetic layer preferably comprises an alloy represented by the composition $X_m Mn_{100-m}$ wherein X is at least one element of Pt, Pd, Ir, Rh, Ru, and Os, and the composition ratio m satisfies 48 atomic % ≦ m ≦ 58 atomic %.

The composition ratio m of the antiferromagnetic layer more preferably satisfies 52 atomic % ≦ m ≦ 55.2 atomic %, or 56.5 atomic % ≦ m ≦ 60 atomic %.

5. The bias layers preferably comprise an alloy represented by the composition $Pt_q Mn_{100-q-j} L_j$ wherein L is at least one element of Au, Ag, Cr, Ni, Ne, Ar, Xe, and Kr, and the composition ratios q and j satisfy 52 atomic % ≦ q+j ≦ 60 atomic %, and 0.2 atomic % ≦ j ≦ 10 atomic %, and the antiferromagnetic layer preferably comprises an alloy represented by the composition $Pt_q Mn_{100-q-j} L_j$ wherein L is at least one element of Au, Ag, Cr, Ni, Ne, Ar, Xe, and Kr, and the composition ratios q and j satisfy 48 atomic % ≦ q+j ≦ 58 atomic %, and 0.2 atomic % ≦ j ≦ 10 atomic %.

A The composition ratios q and j of the antiferromagnetic layer more preferably satisfy 52 atomic % ≦ q+j ≦ 55.2 atomic %, and 0.2 atomic % ≦ j ≦ 10 atomic %, or 56.5 atomic % ≦ q+j ≦ 60 atomic %, and 0.2 atomic % ≦ j ≦ 10 atomic %.

6. The bias layers preferably comprise an alloy represented by the composition $Pt_m Mn_{100-m-n} Z_n$ wherein Z is at least one element of Pd, Ir, Rh, Ru, and Os, and the composition ratios m and n satisfy 52 atomic % ≦ m+n ≦ 60 atomic %, and 0.2 atomic % ≦ n ≦ 40 atomic %, and the antiferromagnetic layer preferably comprises an alloy represented by the composition $Pt_m Mn_{100-m-n} Z_n$ wherein Z is at least one element of Pd, Ir, Rh, Ru, and Os, and the composition ratios m and n satisfy 48 atomic % ≦ m+n ≦ 58 atomic %, and 0.2 atomic % ≦ n ≦ 40 atomic %.

The composition ratios.m and n of the antiferromagnetic layer preferably satisfy 52 atomic % ≦ m+n ≦ 55.2 atomic %, and 0.2 atomic % ≦ n ≦ 40 atomic %, or 56.5 atomic % ≦ m+n ≦ 60 atomic %, and 0.2 atomic % ≦ n ≦ 40 atomic %.

The above problems can be solved by a method of manufacturing a spin-valve thin film magnetic element comprising the step of depositing in turn an antiferromagnetic layer, a pinned magnetic layer, a nonmagnetic conductive layer, a free magnetic layer, and a bias layer on a substrate to form a lamination, the step of heat-treating the lamination at a first heat treatment temperature while applying a first magnetic field in the direction perpendicular to the direction of the track width to produce an exchange anisotropic magnetic field in each of the antiferromagnetic layer and the bias layer so that the magnetization directions of the pinned magnetic layer and the free magnetic layer are pinned in the same direction, and the exchange anisotropic magnetic field of the antiferromagnetic layer is higher than that of the bias layer, the step of heat-treating the lamination at a second heat treatment temperature higher than the first heat treatment temperature while applying a second magnetic field higher than the exchange anisotropic magnetic field of the bias layer and lower than that of the antiferromagnetic layer in the direction of the track width to apply a bias magnetic field to the free magnetic layer in the direction perpendicular to the magnetization direction of the pinned magnetic layer, the step of removing a portion of the bias layer to form a concave having a width close to the track width and form a track groove having a width corresponding to the track width in a portion of the free magnetic layer located below the concave, and the step of forming a conductive layer on the bias layer, for supplying a sensing current.

In the method of manufacturing a spin-valve thin film magnetic element, each of the antiferromagnetic layer and the bias layer preferably comprises an alloy containing Mn and at least one element of Pt, Pd, Rh, Ru, Ir, Os, Au, Ag, Cr, Ni, Ne, Ar, Xe, and Kr.

In the method of manufacturing a spin-valve thin film magnetic element, the first heat treatment temperature is preferably in the range of 220° C. to 240° C.

In the method of manufacturing a spin-valve thin film magnetic element, the second heat treatment temperature is preferably in the range of 250° C. to 270° C.

FIG. 17 is a graph showing the relation between the heat treatment temperature of an antiferromagnetic layer and an exchange anisotropic magnetic field in each of a bottom type spin-valve thin film magnetic element and a top type spin-valve thin film magnetic element.

FIG. 17 indicates that in the bottom type spin-valve thin film magnetic element in which the antiferromagnetic layer is provided near a substrate (or the antiferromagnetic layer is provided below a pinned magnetic layer), the exchange anisotropic magnetic field of the antiferromagnetic layer (marked with ■) is exhibited at 200° C., and exceeds 600 (Oe) at near 240° C. On the other hand, in the top type spin-valve thin film magnetic element in which the distance between the antiferromagnetic layer and the substrate is greater than the bottom type spin-valve thin film magnetic element (or the antiferromagnetic layer is provided above the pinned magnetic layer), the exchange anisotropic magnetic field of the antiferromagnetic layer (marked with ◆) is exhibited at 240° C., and exceeds 600 (Oe) at about 260° C. at last.

It is thus found that in the antiferromagnetic layer of the bottom type spin-valve thin film magnetic element in which the antiferromagnetic layer is provided near the substrate (or the antiferromagnetic layer is provided below the pinned magnetic layer), a high exchange anisotropic magnetic field can be obtained a relatively low heat treatment temperature, as compared with the top type spin-valve thin film magnetic element in which the distance between the antiferromagnetic layer and the substrate is greater than the bottom type spin-valve thin film magnetic element (or the antiferromagnetic layer is provided above the pinned magnetic layer).

The spin-valve thin film magnetic element of the present invention is the bottom type spin-valve thin film element in which the antiferromagnetic layer is provided near the substrate, and the bias layer made of the same material as the antiferromagnetic layer is provided at a larger distance from the substrate than the antiferromagnetic layer.

In the bottom type spin-valve thin film magnetic element in which the antiferromagnetic layer is provided near the substrate, the antiferromagnetic layer is provided below the pinned magnetic layer, while in the top type spin-valve thin film magnetic element in which the distance between the antiferromagnetic layer and the substrate is larger than the bottom type spin-valve thin film magnetic element, the antiferromagnetic layer is provided on the pinned magnetic layer.

Therefore, in the method of manufacturing the spin-valve thin film magnetic element of the present invention, for example, the lamination is heat-treated at the first heat treatment temperature (220 to 240° C.) with the first magnetic field applied to produce an exchange anisotropic magnetic field in each of the antiferromagnetic layer and the bias layer so that the magnetization directions of the pinned magnetic layer and the free magnetic layer are pinned in the same direction. Furthermore, the exchange anisotropic magnetic field of the antiferromagnetic layer becomes 600 (Oe) or more, which is higher than the exchange anisotropic magnetic field of 100 (Oe) or less of the bias layer.

Next, the lamination is heat-treated at the second heat treatment temperature (250 to 270° C.) with the second magnetic field applied perpendicularly to the first magnetic field so that the exchange anisotropic magnetic field of the bias layer becomes 600 (Oe) or more, which is higher than that of the bias layer produced in the first heat treatment. Therefore, the magnetization direction of the free magnetic layer crosses the direction of the first magnetic field.

At this time, the second magnetic field is set to be lower than the exchange anisotropic magnetic field of the antiferromagnetic layer, which is produced in the first heat treatment, so that even with the second magnetic field applied to the antiferromagnetic layer, the exchange anisotropic magnetic field of the antiferromagnetic layer does not deteriorate, and the magnetization direction of the pinned magnetic layer can be left pinned.

As a result, the magnetization directions of the pinned magnetic layer and the free magnetic layer can be crossed each other.

Therefore, in the method of manufacturing a spin-valve thin film magnetic element, an alloy having excellent heat resistance, such as a PtMn alloy, is used for not only the antiferromagnetic layer but also the bias layer, and thus an exchange anisotropic magnetic field can be applied to the bias layer in order to orient the magnetization direction of the free magnetic layer in the direction perpendicular to the magnetization direction of the pinned magnetic layer without adversely affecting the magnetization direction of the pinned magnetic layer. It is thus possible to orient the magnetization direction of the free magnetic layer in the direction perpendicular to the magnetization direction of the pinned magnetic layer, thereby providing a spin-valve thin film magnetic element having excellent heat resistance and symmetry of a reproduced signal waveform.

The method of manufacturing a spin-valve thin film magnetic element comprises depositing in turn the antiferromagnetic layer, the pinned magnetic layer, the nonmagnetic conductive layer, the free magnetic layer and the bias layer on the substrate to form the lamination, and then heat-treating the lamination. Therefore, in forming the lamination, the surface of each of the layers formed between the substrate and the bias layer is not exposed to air, and thus need not be cleaned by ion milling or reverse sputtering apart from cases in which the surface of each layer is exposed to air and is thus cleaned before forming upper layers. The manufacturing method is thus simplified and exhibits good reproducibility. Since the surface of each of the layers need not be cleaned by ion milling or reverse sputtering, the manufacturing method causes no problem resulting from cleaning, such as contamination with matters adhering to the surfaces, the adverse effect of the disordered surface crystal state on the occurrence of an exchange anisotropic magnetic field, etc.

The method of manufacturing a spin-valve thin film magnetic element comprises removing a portion of the bias layer to form a concave having a width near the track width and form a track groove having a width corresponding to the track width in a portion of the free magnetic layer, which is located below the concave. Therefore, even with variation in the thickness of the bias layer, the bias layer does not remain at the bottom of the track groove, thereby precisely defining the track width, and obtaining a spin-valve thin film magnetic element adaptable to hither recording density. Since a portion of the bias layer can be easily completely removed, a thin film magnetic element can easily be manufactured.

A thin film magnetic head of the present invention comprises the above-described spin-valve thin film magnetic element provided on a slider.

The thin film magnetic head exhibits excellent durability and heat resistance, and produces a sufficient exchange anisotropic magnetic field.

BRIEF DESCRIPTION OF THE DRAWINGS

FIG. 1 is a sectional view showing the structure of a spin-valve thin film magnetic element according to a first embodiment of the present invention, as viewed from the side facing a recording medium;

FIG. 14 is a sectional view illustrating a step of a method of manufacturing the spin-valve thin film magnetic element shown in FIG. 13, in which a lamination is formed on a substrate;

FIG. 15 is a sectional view illustrating a step of the method of manufacturing the spin-valve thin film magnetic element shown in FIG. 13, in which a lift off resist is formed;

FIG. 19 is a sectional view showing the structure of a spin-valve thin film magnetic element used for measuring the data shown in the graphs of FIGS. 17 and 18, as viewed from the side facing a recording medium; and FIG. 20 is a sectional view showing the structure of a spin-valve thin film magnetic element used for measuring the data shown in the graphs of FIGS. 17 and 18, as viewed from the side facing a recording medium.

DESCRIPTION OF THE PREFERRED EMBODIMENT

Spin-valve thin film elements according to embodiments of the present invention will be described in detail below with reference to the drawings.

First Embodiment

Figure 6:
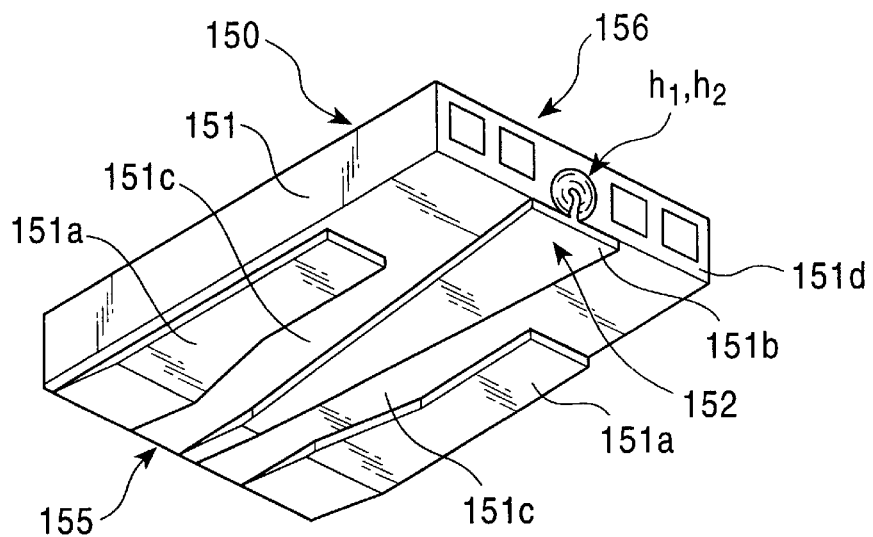
FIG. 6 is a perspective view showing a thin film magnetic head comprising the spin-valve thin film magnetic element according to the first embodiment of the present invention.
Figure 7:
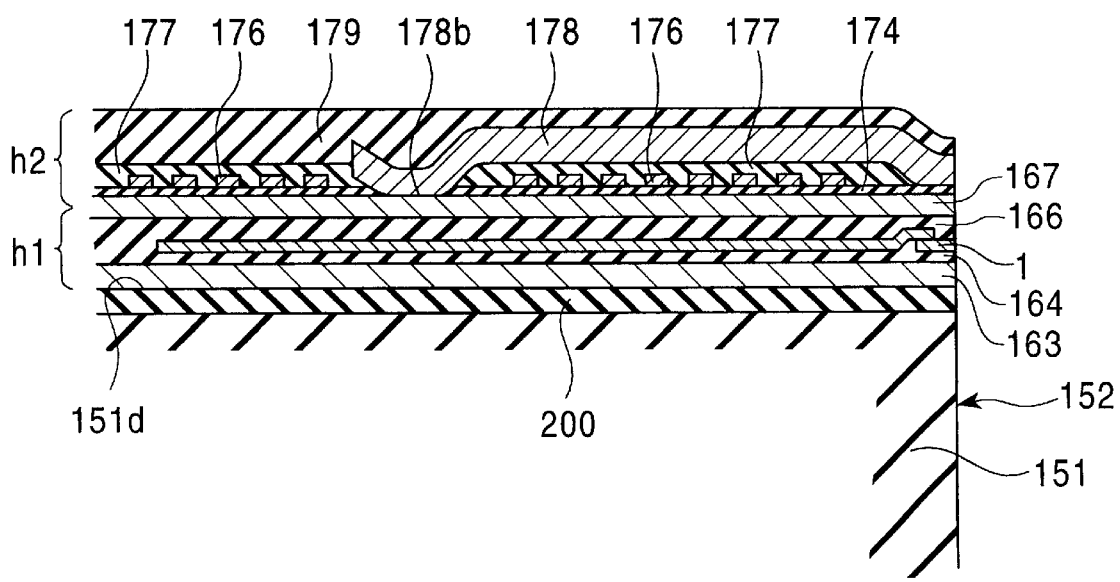
FIG. 7 is a sectional view showing a principal portion of the thin film magnetic head comprising the spin-valve thin film magnetic element according to the first embodiment of the present invention.

FIG. 1 is a sectional view showing the structure of a spin-valve thin film magnetic element according to a first embodiment of the present invention, as viewed from the side facing a recording medium, and FIGS. 6 and 7 are drawings showing a thin film magnetic head comprising the spin-valve thin film magnetic element of the present invention.

Shield layers are formed above and below the spin-valve thin film magnetic element of the present invention with gap layers provided therebetween to form a reproducing GMR head hi comprising the spin-valve thin film element, the gap layers, and the shield layers.

A recording inductive head h2 may be laminated on the reproducing GMR head h1.

As shown in FIG. 6, the GMR head hi comprising the spin-valve thin film magnetic element is provided on the trailing-side end surface 151d of a slider 151 together with the inductive head h2 to constitute a thin film magnetic head 150 so that a recording magnetic field of a magnetic recording medium such as a hard disk or the like can be detected.

In FIG. 1, the movement direction of the magnetic recording medium coincides with the Z direction shown in the drawing, and a leakage magnetic field from the magnetic recording medium coincides with the Y direction.

The thin film magnetic head 150 shown in FIG. 6 mainly comprises the slider 151, and the GMR head h1 and the inductive had h2, both of which are provided on the end surface 151d of the slider 151. Reference numeral 155 denotes the leading side on the upstream side in the movement direction of the magnetic recording medium; reference numeral 156 denotes the trailing side. Furthermore, rails 151a and 151b are formed on the medium-facing surface 152 of the 151, air grooves 151c being formed between the respective rails.

As shown in FIG. 7, the GMR head h1 comprises a lower shield layer 163 formed on the end surface 151d of the slider 151 and made of a magnetic alloy, a lower gap layer 164 deposited on the lower shield layer 163, a spin-valve thin film magnetic element 1 exposed from the medium-facing surface 152, an upper gap layer 166 which covers the spin-valve thin film magnetic element 1 and the lower gap layer 164, and an upper shield layer 167 which covers the upper gap layer 166.

The upper shield layer 167 also serves as a lower core layer of the inductive head h2.

The inductive head h2 comprises the lower core layer (the upper shield layer) 167, a gap layer 174 deposited on the lower core layer 167, a coil 176, an upper insulating layer 177 which covers the coil 176, and an upper core layer 178 which is joined to the gap layer and joined to the lower core layer 167 on the coil 176 side.

The coil 176 is patterned in a spiral planar shape. The base end 178b of the upper core layer 178 is magnetically connected to the lower core layer 167 in a substantially central portion of the coil 178.

Furthermore, a protecting layer 179 made of alumina is deposited on the upper core layer 178.

The spin-valve thin film magnetic element 1 shown in FIG. 1 is a so-called bottom type single spin-valve thin film magnetic element comprising an antiferromagnetic layer, a pinned magnetic layer, a nonmagnetic conductive layer, and a free magnetic layer.

In the spin-valve thin film magnetic element 1, the magnetization direction of the free magnetic layer is oriented in the direction perpendicular to the magnetization direction of the pinned magnetic layer by an exchange bias system.

The exchange bias system is a system suitable for a spin-valve thin film magnetic element with a narrow track corresponding to high-density recording, as compared with a hard bias system, which is difficult to control the effective track width because of the presence of a dead region.

In FIG. 1, reference character K denotes a substrate on which a base insulating layer 200 made of $Al_2O_3$, the lower shield layer 163, the lower gap layer 164, and an antiferromagnetic layer 2 are formed. Furthermore, a pinned magnetic layer 3 is formed on the antiferromagnetic layer 2, a nonmagnetic conductive layer 4 is formed on the pinned magnetic layer 4, and a free magnetic layer 5 is formed on the pinned magnetic layer 3. The free magnetic layer 5 comprises a groove 5B comprising a track groove 5A having the same width as the track width Tw, and flat portions 5C on both sides of the groove 5B, which are provided on the side opposite to the pinned magnetic layer 3 side or opposite to the substrate K side.

Furthermore, bias layers 6 are respectively provided on the flat portions 5C of the free magnetic layer 5, and conductive layers 8 are respectively formed on the bias layers 6.

The substrate K is made of a nonmagnetic material such as $Al_2O_3$-TiC ceramic or the like.

The antiferromagnetic layer 2 preferably comprises an alloy containing Mn and at least one element of Pt, Pd, Ir, Rh, Ru, Os, Au, Ag, Cr, Ni, Ne, Ar, Xe, and Kr. The antiferromagnetic layer 2 comprising such an alloy has excellent heat resistance and corrosion resistance.

The antiferromagnetic layer 2 preferably comprises an alloy represented by the following composition formula:

$$X_m Mn_{100-m}$$

wherein X is at least one element of Pt, Pd, Ir, Rh, Ru, and Os, and the composition ratio m satisfies 48 atomic $\% \leq m \leq 60$ atomic %.

The composition ration m more preferably satisfies 48 atomic $\% \leq m \leq 58$ atomic %.

The antiferromagnetic layer 2 may comprise an alloy represented by the following composition formula:

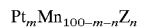

$$Pt_m Mn_{100-m-n} Z_n$$

wherein Z is at least one element of Pd, Ir, Rh, Ru, and Os, and the composition ratios m and n satisfy 48 atomic $\% \leq m+n \leq 60$ atomic %, and 0.2 atomic $\% \leq n \leq 40$ atomic %.

More preferably, the composition ratios m and n satisfy 48 atomic %≦m+n≦58 atomic %, and 0.2 atomic %≦n≦40 atomic %.

The antiferromagnetic layer 2 may comprise an alloy represented by the following composition formula:

$$Pt_qMn_{100-q-j}L_j$$

wherein L is at least one element of Au, Ag, Cr, Ni, Ne, Ar, Xe, and Kr, and the composition ratios q and j satisfy 48 atomic %≦q+j≦60 atomic %, and 0.2 atomic %≦j≦10 atomic %.

More preferably, the composition ratios q and j satisfy 48 atomic %≦q+j≦58 atomic %, and 0.2 atomic %≦j≦10 atomic %.

The pinned magnetic layer 3 comprises, for example, a Co film, a NiFe alloy film, a CoNiFe alloy film, a CoFe alloy film, a CoNi alloy film, or the like.

The pinned magnetic layer 3 shown in FIG. 1 is formed in contact with the antiferromagnetic layer 2, and is magnetized by an exchange anisotropic magnetic field due to exchange coupling produced in the interface between the pinned magnetic layer 3 and the antiferromagnetic layer 2 by heat treatment in a magnetic field.

The magnetization direction of the pinned magnetic layer 3 is pinned in the Y direction shown in the drawing, i.e., the direction (the height direction) away from the recording medium.

The nonmagnetic conductive layer 4 preferably comprises a nonmagnetic conductive film of Cu or the like.

The free magnetic layer 5 comprises the same material as the pinned magnetic layer 3.

The free magnetic layer 5 is magnetized by a bias magnetic field from the bias layers 6 so that the magnetization direction is oriented in the direction opposite to the X1 direction shown in the drawing, i.e., the direction perpendicular to the magnetization direction of the pinned magnetic layer 3.

The free magnetic layer 5 is put into a single magnetic domain state by the bias layers 6, thereby preventing the occurrence of Barkhausen noise.

The bias layers 6 preferably comprise an alloy containing Mn and at least one element of Pt, Pd, Ir, Rh, Ru, Os, Au, Ag, Cr, Ni, Ne, Ar, Xe, and Kr. In heat treatment in a magnetic field, an exchange anisotropic magnetic field is produced in the interface with the free magnetic layer 5 so that the free magnetic layer 5 is magnetized in a predetermined direction.

The bias layers 6 comprising such an alloy have excellent heat resistance and corrosion resistance.

The bias layers 6 preferably comprise an alloy represented by the following composition formula:

$$X_mMn_{100-m}$$

wherein X is at least one element of Pt, Pd, Ir, Rh, Ru, and Os, and the composition ratio m satisfies 52 atomic %≦m≦60 atomic %.

The bias layers may comprise an alloy represented by the following composition formula:

$$Pt_mMn_{100-m-n}Z_n$$

wherein Z is at least one element of Pd, Ir, Rh, Ru, Os, Au, Ag, Cr, and Ni and the composition ratios m and n satisfy 52 atomic %≦m+n≦60 atomic %, and 0.2 atomic %=n≦10 atomic %.

The bias layers 6 may comprise an alloy represented by the following composition formula:

$$Pt_qMn_{100-q-j}L_j$$

wherein L is at least one element of Au, Ag, Cr, Ni, Ne, Ar, Xe, and Kr, and the composition ratios q and j satisfy 52 atomic %≦q+j≦60 atomic %, and 0.2 atomic %≦j≦10 atomic %.

The conductive layers 8 preferably comprise, for example, Au, W, Cr, Ta, or the like.

The arrangement of the antiferromagnetic, pinned magnetic, nonmagnetic conductive, free magnetic, bias, and conductive layers has been described in a preferred manner. However, they may be operatively connected in other fashions as long as the required electrical, mechanical, and magnetic properties of a spin valve are achieved. There may be one or more additional layers between any or all of them.

In the spin-valve thin film magnetic element 1, a stationary current is supplied to the free magnetic layer 5, the nonmagnetic conductive layer 4, and the pinned magnetic layer 3 from the conductive layers 8, and a leakage magnetic field in the Y direction shown in the drawing is applied from the magnetic recording medium moved in the Z direction shown in the drawing. As a result, the magnetization direction of the free magnetic layer 5 is changed from the direction opposite to the X1 direction shown in the drawing to the Y direction shown in the drawing. The electric resistance is changed with the relation between the change of the magnetization direction of the free magnetic layer 5 and the magnetization direction of the pinned magnetic layer 3 so that the leakage magnetic field from the magnetic recording medium is detected by a change in voltage based on the change in resistance.

Description will now be made of the method of manufacturing the spin-valve thin film magnetic element 1 of the present invention.

The manufacturing method utilizes the fact that the intensity of the exchange anisotropic magnetic field produced in each of the antiferromagnetic layer 2 and the bias layers 6 by heat treatment changes with the positions of the antiferromagnetic layer 2 and the bias layers 6 in the spin-valve thin film magnetic element 1. The manufacturing method comprises first heat treatment for pinning the magnetization direction of the pinned magnetic layer 3, and second heat treatment for orienting the magnetization direction of the free magnetic layer 5.

Figure 2:
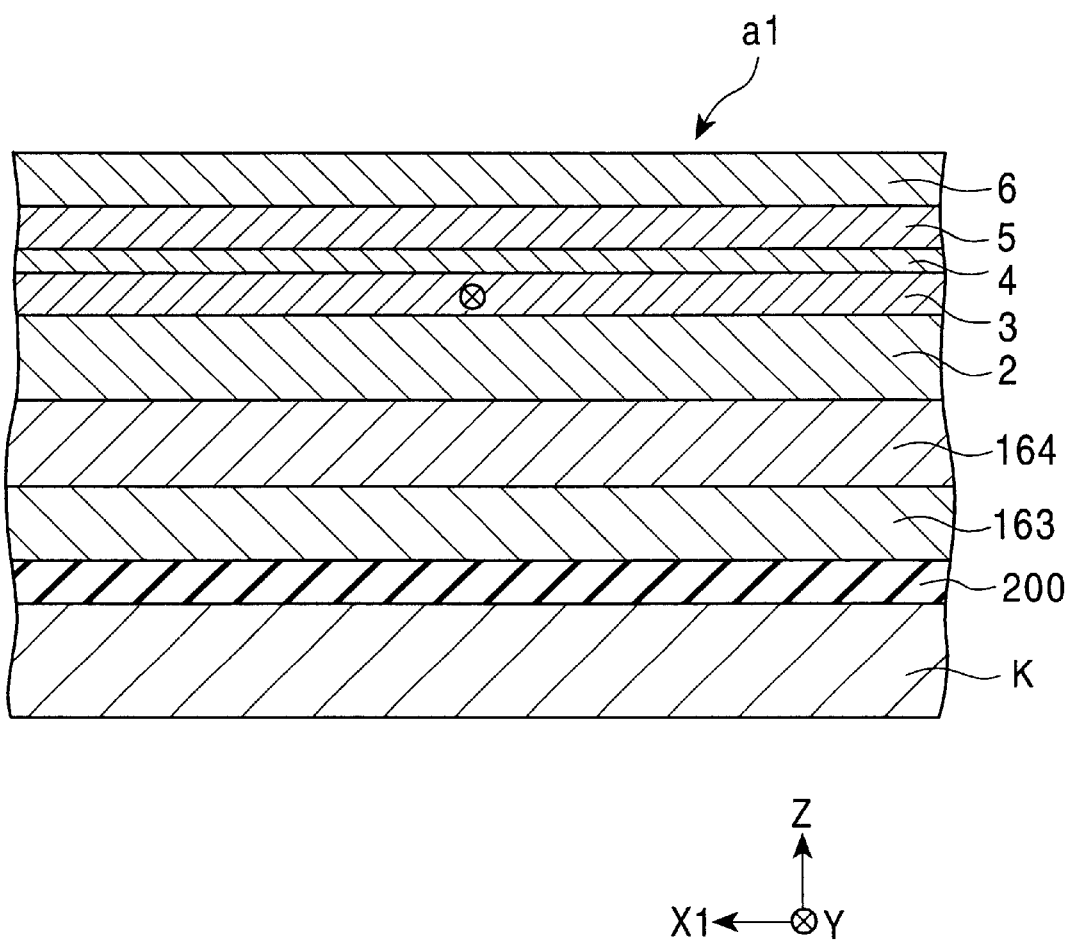
FIG. 2 is a sectional view illustrating a step of a method of manufacturing the spin-valve thin film magnetic element shown in FIG. 1, in which a lamination is formed on a substrate.

Namely, the method of manufacturing the spin-valve thin film magnetic element 1 of the present invention comprises depositing in turn the antiferromagnetic layer 2, the pinned magnetic layer 3, the nonmagnetic conductive layer 4, the free magnetic layer 5, and the bias layers 6 on the substrate K to form the lamination al shown in FIG. 2, and then heat-treating the lamination al at a first heat treatment temperature while applying a first magnetic field perpendicular to the direction of the track width Tw to produce an exchange anisotropic magnetic field in each of the antiferromagnetic layer 5 and the bias layers 6 so that the magnetization directions of the pinned magnetic layer 3 and the free magnetic layer 5 are pinned in the same direction, and the exchange anisotropic magnetic field of the antiferromagnetic layer 2 is higher than that of the bias layers 6.

Then, heat treatment is performed at a second heat treatment temperature higher than the first heat treatment temperature while applying, in the direction of the track width Tw, a second magnetic field higher than the exchange anisotropic magnetic field of the bias layers 6 and lower than the exchange anisotropic magnetic field of the antiferromganetic layer 2 to apply a bias magnetic field to the free magnetic layer 5 in the direction perpendicular to the magnetization direction of the pinned magnetic layer 3.

Figure 3:
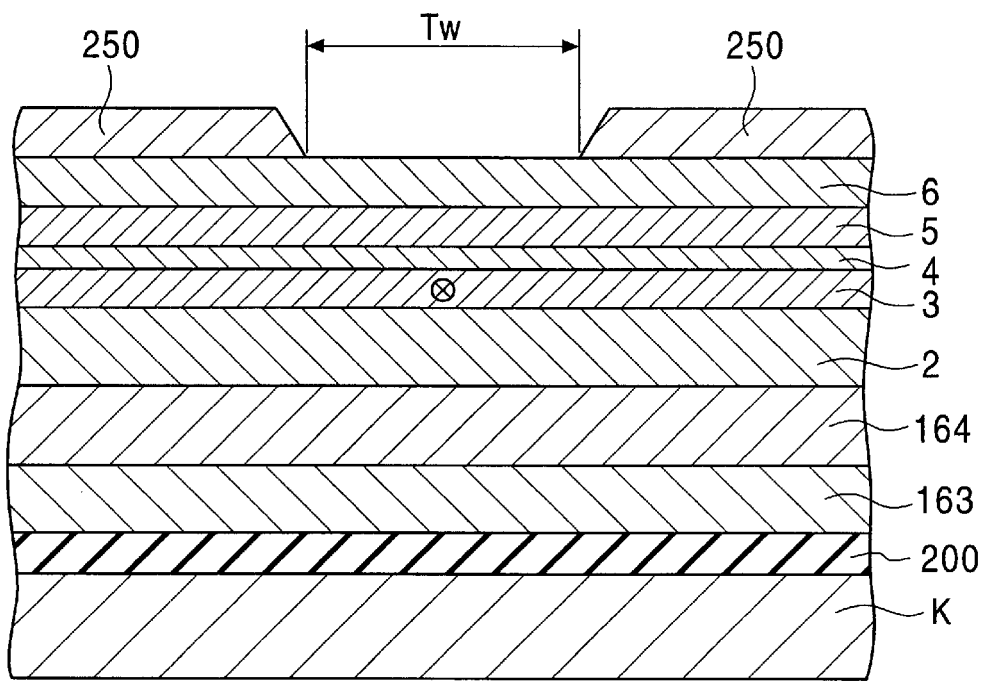
FIG. 3 is a sectional view illustrating a step of the method of manufacturing the spin-valve thin film magnetic element shown in FIG. 1, in which a mask is formed.
Figure 4:
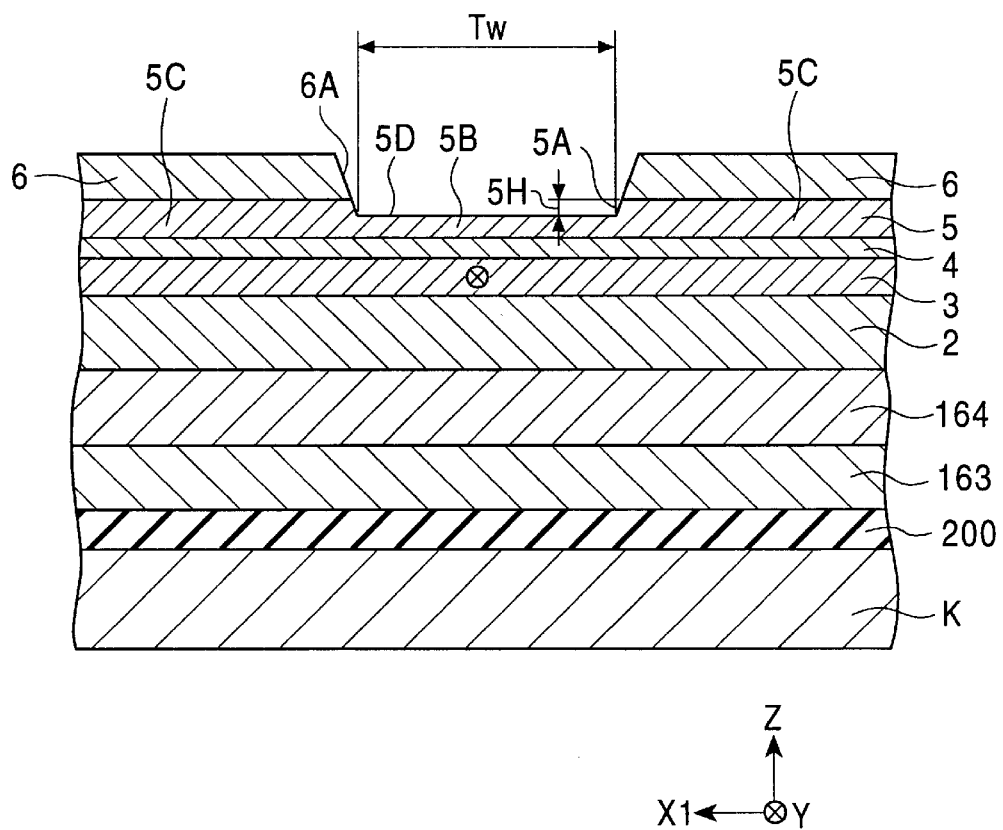
FIG. 4 is a sectional view illustrating a step of the method of manufacturing the spin-valve thin film magnetic element shown in FIG. 1, in which a track groove is formed.

Furthermore, as shown in FIG. 3, a resist mask 250 having a space with a width close to the track width Tw is formed on the heat-treated lamination a1. Then, as shown in FIG. 4, a portion of the bias layers 6 is removed by ion milling or the like to form a concave 6A having a width close to the track width Tw and form a track groove 5A in a portion of the free magnetic layer 5, which is located below the concave 6A, and the resist mask 250 is removed.

The track groove 5A is preferably formed to have the same width as the track width Tw.

The track groove 5A is preferably formed to have a depth 5H of about 10 to 50 $\mu$m. With the track groove 5A having a depth 5H of less than about 10 $\mu$m, for example, where there is variation in the thickness of the bias layers 6, the portion of the bias layers 6, which should be removed, is not completely removed to cause the possibility of leaving the bias layers 6 at the bottom 5D of the track groove 5A. On the other hand, with the track groove 5A having a depth 5H of over about 50 $\mu$m, variation easily occurs in the free magnetic layer 5 due to variation in etching depth by ion milling.

Figure 5:
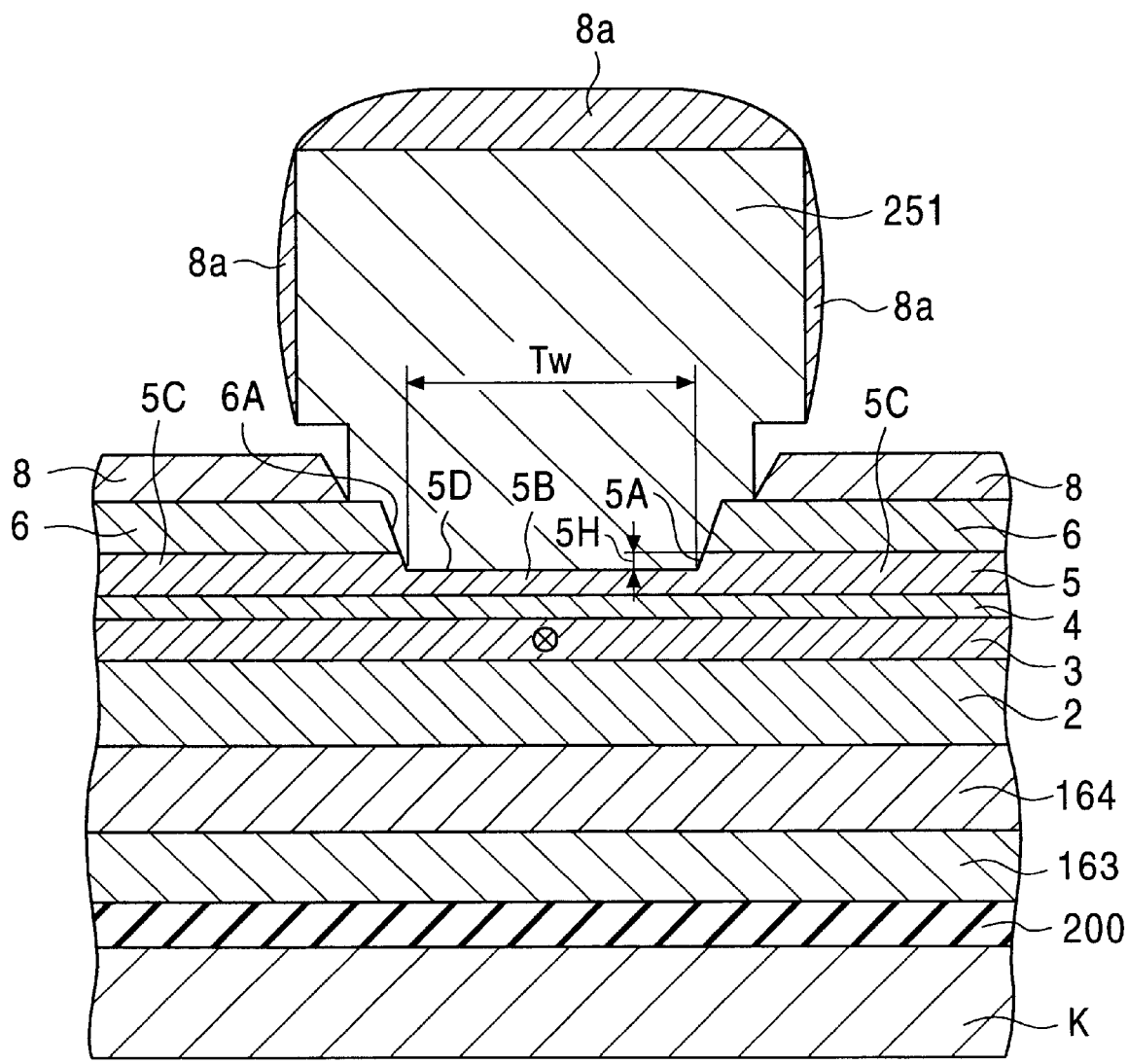
FIG. 5 is a sectional view illustrating a step of the method of manufacturing the spin-valve thin film magnetic element shown in FIG. 1, in which a conductive layer is formed.

Then, a lift off resist 251 is formed to cover the concave 6A, the track groove 5A and a part of the flat portions of the bias layers 6, as shown in FIG. 5. Then, a conductive layer 8a is formed on the surface of the lift off resist 251, and the conductive layers 8 are formed on the exposed flat portions of the bias layers 6. Then, the lift off resist 251 is removed to obtain the spin-valve thin film magnetic element 1 in which the conductive layers 8 are respectively formed on the bias layers, for supplying a sensing current to the free magnetic layer 5, as shown in FIG. 1.

Next, the relation between the heat treatment temperature and the exchange anisotropic magnetic field of the antiferromagnetic layer is described in detail below with reference to FIGS. 17, 19 and 20.

Figure 17:
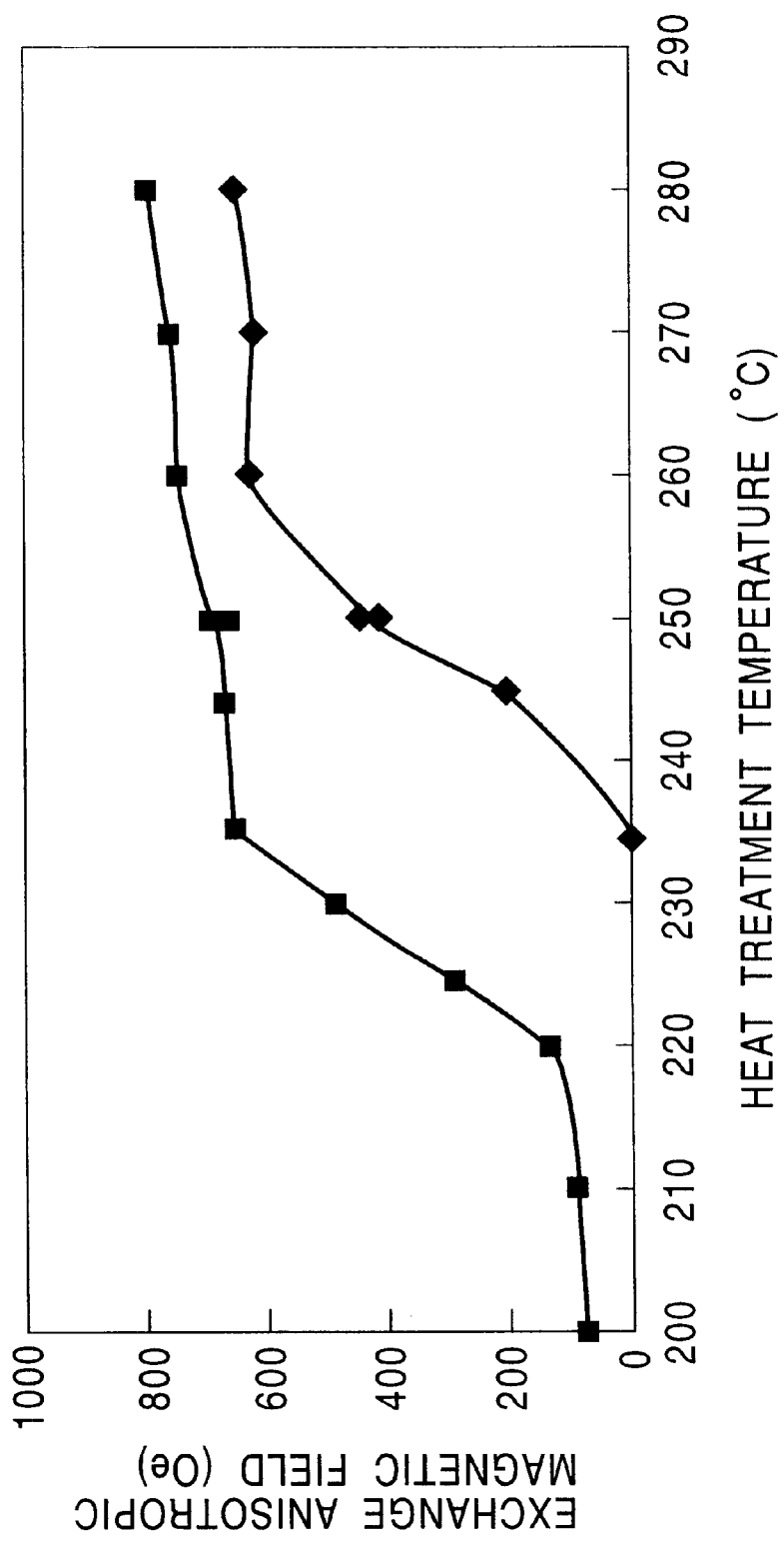
FIG. 17 is a graph showing the dependency of an exchange anisotropic magnetic field on the heat treatment temperature of each of a $Pt_{55.4}Mn_{44.6}$ alloy and a $Pt_{54.4}Mn_{45.6}$ alloy.

In FIG. 17, mark ■ shows the dependency of the exchange anisotropic magnetic field on heat treatment of a bottom type single spin-valve thin film magnetic element in which an antiferromagnetic layer is provided between a substrate and a free magnetic layer, and mark ◆ shows the dependency of the exchange anisotropic magnetic field on heat treatment of a top type single spin-valve thin film magnetic element in which an antiferromagnetic layer is provided farther from a substrate than a free magnetic layer.

Therefore, the antiferromagnetic layer of the top type single spin-valve thin film magnetic element marked with ◆ is provided farther from the substrate than the antiferromagnetic layer of the bottom type single spin-valve thin film magnetic element marked with ■.

More specifically, the top type single spin-valve thin film magnetic element marked with ◆ in FIG. 17 comprises a base insulating layer 200 made of $Al_2O_3$ (1000), a base layer 210 made of Ta (50), a free magnetic 5 comprising two layers of NiFe alloy (70) and Co (10), a nonmagnetic conductive layer 4 made of Cu (30), a pinned magnetic layer 3 made of Co (25), an antiferromagnetic layer 2 made of $Pt_{55.4}Mn_{44.6}$ (300), and a protecting layer 220 made of Ta (50), which are formed in turn on a Si substrate K, as shown in FIG. 19.

The bottom type single spin-valve thin film magnetic element marked with ■ in FIG. 17 comprises a base insulating layer 200 made of $Al_2O_3$ (1000), a base layer 210 made of Ta (30), an antiferromagnetic layer 2 made of $Pt_{55.4}Mn_{44.6}$ (300), a pinned magnetic layer 3 made of Co (25), a nonmagnetic conductive layer 4 made of Cu (26), a free magnetic 5 comprising two layers of Co (10) and NiFe alloy (70), and a protecting layer 220 made of Ta (50), which are formed in turn on a Si substrate K, as shown in FIG. 20.

A numeral value in parentheses shows the thickness of each layer by the unit of angstrom.

In the top type single spin-valve thin film magnetic element marked with ◆ in FIG. 17, the antiferromagnetic layer 2 is provided above the pinned magnetic layer 3 so that the free magnetic layer 5, the nonmagnetic conductive layer 4, and the pinned magnetic layer 3 are held between the substrate K and the antiferromagnetic layer 2.

On the other hand, in the bottom type single spin-valve thin film magnetic element marked with ■ in FIG. 17, the antiferromagnetic layer 2 is provided below the pinned magnetic layer 3 so that the pinned magnetic layer 3, the nonmagnetic conductive layer 4, and the free magnetic layer 5 are not formed between the substrate K and the antiferromagnetic layer 2.

FIG. 17 indicates that the exchange anisotropic magnetic field of the antiferromagnetic layer 2 marked with ■ starts to increase at 220° C., and becomes constant at about 700 (Oe) at over 240° C. FIG. 17 also indicates that the exchange anisotropic magnetic field of the antiferromagnetic layer 2 marked with ◆ starts to increase at 240° C., and becomes constant at about 600 (Oe) at over 260° C.

It is thus found that the antiferromagnetic layer 2 (marked with ■) provided near the substrate produces a high exchange anisotropic magnetic field at a relatively low heat treatment temperature, as compared with the antiferromagnetic layer 2 (marked with ◆) provided far from the substrate.

The method of manufacturing the spin-valve thin film magnetic element 1 of the present invention employs the above-described properties of the antiferromagnetic layer.

Namely, the spin-valve thin film magnetic element 1 of the present invention is the bottom type spin-valve thin film magnetic element in which the antiferromagnetic layer 2 is provided near the substrate K (or the antiferromagnetic layer is provided below the pinned magnetic layer), and the bias layer 6 made of the same alloy as the antiferromagnetic layer 2 is provided farther from the substrate K than the antiferromagnetic layer 2.

Therefore, for example, the lamination al is heat-treated at the first heat treatment temperature (220 to 240° C.) with the first magnetic field applied, to produce an exchange isotropic magnetic field in each of the antiferromagnetic layer 2 and the bias layer 6 so that the magnetization directions of the pinned magnetic layer 3 and the free magnetic layer 5 are pinned in the same direction. Furthermore, the exchange anisotropic magnetic field of the antiferromagnetic layer 2 is 600 (Oe) or more, and the exchange anisotropic magnetic field of the bias layers 6 is 100 (Oe) or less. The exchange anisotropic magnetic field of the antiferromagnetic layer 2 is higher than the bias layers 6.

The lamination al is next heat-treated at the second heat treatment temperature (250 to 270° C.) with the second magnetic field applied perpendicularly to the first magnetic field to produce an exchange anisotropic magnetic field of 600 (Oe) or more in the bias layer 6, which is higher than the exchange anisotropic magnetic field produced in the bias layer 6 by the first heat treatment. Therefore, the magnetization direction of the free magnetic layer 5 crosses the direction of the first magnetic field.

At this time, if the second magnetic field is lower than the exchange anisotropic magnetic filed produced in the antiferromagnetic layer 2 by the first heat treatment, the exchange anisotropic magnetic field of the antiferromagnetic layer 2 does not deteriorate even by applying the second magnetic field to the antiferromagnetic layer 2, and the magnetization direction of the pinned magnetic layer 3 can be left pinned.

As a result, the magnetization directions of the pinned magnetic layer 3 and the free magnetic layer 5 can be crossed each other.

The first heat treatment temperature is preferably in the range of 220 to 240° C. With a first heat treatment temperature of less than 220° C., the exchange anisotropic magnetic field of the antiferromagnetic layer 2 becomes 200 (Oe) or less to fail to increase magnetization of the pinned magnetic layer 3, and thus the magnetization direction of the pinned magnetic layer 3 is undesirably oriented in the same direction as the magnetization direction of the free magnetic layer 5 by the second heat treatment. While with a first heat treatment temperature of over 240° C., the exchange anisotropic magnetic field of the bias layers 6 is increased to cause difficulties in moving magnetization of the free magnetic layer 5 by applying a weak magnetic field, and thus the magnetization directions of the free magnetic layer 5 and the pinned magnetic layer 3 cannot be crossed each other by the second heat treatment. The first heat treatment temperature is more preferably in the range of 230 to 240° C. a because the exchange anisotropic magnetic field of the antiferromagnetic layer 2 can be increased to 400 (Oe) or more, and the exchange anisotropic magnetic field of the pinned magnetic layer 3 can be increased.

The second heat treatment temperature is preferably in the range of 250 to 270° C. With a second heat treatment temperature of less than 250° C., the exchange anisotropic magnetic field of the bias layers 6 cannot be increased to 400 (Oe) or more to fail to increase a longitudinal bias magnetic field of the free magnetic layer 5. In addition, the magnetization direction of the free magnetic layer 5, which is pinned by the first heat treatment, cannot be undesirably oriented in the direction perpendicular to the magnetization direction of the pinned magnetic layer 3. While with a second heat treatment temperature of over 270° C., the exchange anisotropic magnetic field of the bias layers 6 is not increased and becomes constant to undesirably cause deterioration in the magnetoresistive effect due to heat diffusion at the layer interface.

Figure 18:
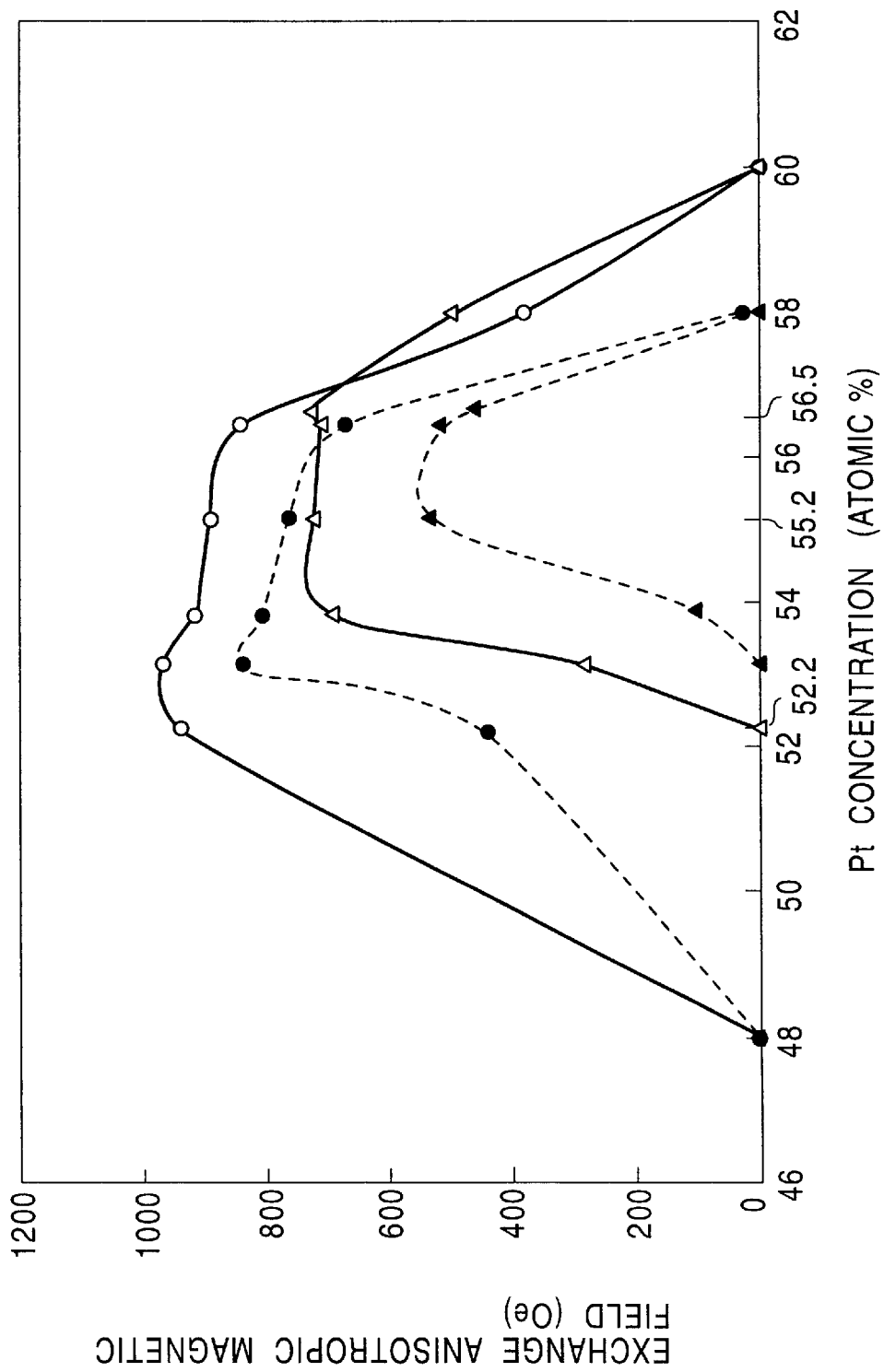
FIG. 18 is a graph showing the dependency of an exchange anisotropic magnetic field on the Pt concentration of each of $Pt_m Mn_{100-m}$ alloys.

FIG. 18 suggests that by appropriately controlling the compositions of the antiferromagnetic layer 2 and the bias layers 6 to different compositions, a state preferable for the second heat treatment can be obtained so that the exchange anisotropic magnetic field obtained in the antiferromagnetic layer 2 after the first heat treatment is increased, and substantially no exchange anisotropic magnetic field occurs in the bias layers 6 after the first heat treatment.

The relation between the composition of the antiferromagnetic layer and the exchange anisotropic magnetic field with a heat treatment temperature of 245° C. or 270° C. will be described in detail below with reference to FIG. 18.

In FIG. 18, marks Δ and ▲ show the relation between the composition of the antiferromagnetic layer and the exchange anisotropic magnetic field of a top type single spin-valve thin film magnetic element in which the antiferromagnetic layer is provided farther from the substrate than the free magnetic layer (or the antiferromagnetic layer is provided above the pinned magnetic layer). In FIG. 18, marks Δ and ▲ show the results with heat treatment temperatures of 270° C. and 245° C., respectively.

In FIG. 18, marks ○ and ● show the relation between the composition of the antiferromagnetic layer and the exchange anisotropic magnetic field of a bottom type single spin-valve thin film magnetic element in which the antiferromagnetic layer is provided between the free magnetic layer and the substrate (or the antiferromagnetic layer is provided below the pinned magnetic layer). In FIG. 18, marks ○ and ● show the results with heat treatment temperatures of 270° C. and 245° C., respectively.

More specifically, the top type single spin-valve thin film magnetic element marked with Δ and ▲ comprises the base insulating layer 200 made of $Al_2O_3$ (1000), the base layer 210 made of Ta (50), the free magnetic 5 comprising two layers of NiFe alloy (70) and Co (10), the nonmagnetic conductive layer 4 made of Cu (30), the pinned magnetic layer 3 made of Co (25), the antiferromagnetic layer 2 made of $Pt_mMn_t$ (300), and the protecting layer 220 made of Ta (50), which are formed in turn on the Si substrate K, as shown in FIG. 19.

The bottom type single spin-valve thin film magnetic element marked with ○ and ● comprises the base insulating layer 200 made of $Al_2O_3$ (1000), the base layer 210 made of Ta (30), the antiferromagnetic layer 2 made of $Pt_mMn_t$ (300), the pinned magnetic layer 3 made of Co (25), the nonmagnetic conductive layer 4 made of Cu (26), the free magnetic 5 comprising two layers of Co (10) and NiFe alloy (70), and the protecting layer 220 made of Ta (50), which are formed in turn on the Si substrate K, as shown in FIG. 20.

A numerical value in parentheses indicates the thickness of each of the layers by the unit of angstrom.

The method of manufacturing the spin-valve thin film magnetic element 1 of the present invention employs the properties of the bottom type spin-valve thin film magnetic element and the top type spin-valve thin film magnetic element shown in FIG. 18.

Namely, in the spin-valve thin film magnetic element 1 of the present invention, which is the bottom type spin-valve thin film magnetic element, the alloy used for the antiferromagnetic layer 2 preferably has the same composition range as the antiferromagnetic layer of the bottom type spin-valve thin film magnetic element shown in FIG. 18, and the alloy used for the bias layer 6 preferably has the same composition range as the antiferromagnetic layer of the top type spin-valve thin film magnetic element shown in FIG. 18.

FIG. 18 also indicates that where the antiferromagnetic layer of the bottom type spin-valve thin film magnetic element, i.e., the antiferromagnetic layer 2, is made of an alloy represented by the formula $X_mMn_{100-m}$ (wherein X is at least one element of Pt, Pd, Ir, Rh, Ru, and Os), the composition ratio m preferably satisfies 48 atomic $\% \leq m \leq 60$ atomic %.

With the composition ratio m of less than 48 atomic % or over 60 atomic %, the crystal lattice of $X_mMn_{100-m}$ cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

The composition ratio m more preferably satisfies 48 atomic $\% \leq m \leq 58$ atomic %.

With the composition ratio m of less than 48 atomic % or over 58 atomic %, the crystal lattice of $X_mMn_{100-m}$ cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field (exchange anisotropic magnetic field) cannot be exhibited.

Where the antiferromagnetic layer the bottom type spin-valve thin film magnetic element, i.e., the antiferromagnetic layer 2, is made of an alloy represented by the formula $Pt_mMn_{100-m-n}Z_n$ (wherein Z is at least one element of Pd, Ir, Rh, Ru, and Os), the composition ratios m and n preferably satisfy 48 atomic $\% \leq m+n \leq 60$ atomic %, and 0.2 atomic $\% \leq n \leq 40$ atomic.

With the value (m+n) of less than 48 atomic % or over 60 atomic %, the crystal lattice $Pt_mMn_{100-m-n}Z_n$ of cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio n of less than 0.2 atomic %, the effect of accelerating ordering of the crystal lattice of the antiferromagnetic layer, i.e., the effect of increasing the exchange anisotropic magnetic field, cannot be sufficiently exhibited, while with the composition ratio n of over 40 atomic %, the exchange anisotropic magnetic field is conversely decreased.

The (m+n) value is more preferably in the range of 48 atomic $\% \leq m+n \leq 58$ atomic %.

With the (m+n) value of less than 48 atomic % or over 58 atomic %, the crystal lattice $Pt_mMn_{100-m-n}Z_n$ of cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field cannot be exhibited.

Where the antiferromagnetic layer of the bottom type spin-valve thin film magnetic element, i.e., the antiferromagnetic layer 2, is made of an alloy represented by the formula $Pt_qMn_{100-q-j}L_j$ (wherein L is at least one element of Au, Ag, Cr, Ni, Ne, Ar, Xe, and Kr), the composition ratios q and j preferably satisfy 48 atomic $\% \leq q+j \leq 60$ atomic %, and 0.2 atomic $\% \leq j \leq 10$ atomic %.

With the (q+j) value of less than 48 atomic % or over 60 atomic %, the crystal lattice of $Pt_qMn_{100-q-j}L_j$ cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio j of less than 0.2 atomic %, the effect of improving a unidirectional exchange coupling magnetic field is not sufficiently exhibited by adding element L, while with the composition ratio j of over 10 atomic %, the unidirectional exchange anisotropic magnetic field undesirably deteriorates.

The (q+j) value is more preferably in the range of 48 atomic $\% \leq q+j \leq 58$ atomic %.

With the (q+j) value of less than 48 atomic % or over 58 atomic %, the crystal lattice $Pt_qMn_{100-q-j}L_j$ of cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field cannot be exhibited.

FIG. 18 also indicates that where the antiferromagnetic layer of the top type spin-valve thin film magnetic element, i.e., the bias layers 6, are made of an alloy represented by the formula $X_mMn_{100-m}$ (wherein X is at least one element of Pt, Pd, Ir, Rh, Ru, and Os), the composition ratio m preferably satisfies 52 atomic $\% \leq m \leq 60$ atomic %.

With the composition ratio m of less than 52 atomic % or over 60 atomic %, the crystal lattice of $X_mMn_{100-m}$ cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

Where the antiferromagnetic layer the top type spin-valve thin film magnetic element, i.e., the bias layers 6, are made of an alloy represented by the formula $Pt_mMn_{100-m-n}Z_n$ (wherein Z is at least one element of Pd, Ir, Rh, Ru, and Os), the composition ratios m and n preferably satisfy 52 atomic $\% \leq m+n \leq 60$ atomic %, and 0.2 atomic $\% \leq n \leq 40$ atomic %.

With the (m+n) value of less than 52 atomic % or over 60 atomic %, the crystal lattice $Pt_mMn_{100-m-n}Z_n$ of cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio n of less than 0.2 atomic %, the effect of accelerating ordering of the crystal lattice of the antiferromagnetic layer, i.e., the effect of increasing the exchange anisotropic magnetic field, cannot be sufficiently exhibited, while with the composition ratio n of over 40 atomic %, the exchange anisotropic magnetic field is conversely decreased.

Where the antiferromagnetic layer of the top type spin-valve thin film magnetic element, the bias layers 6, are made of an alloy represented by the formula $Pt_qMn_{100-q-j}L_j$ (wherein L is at least one element of Au, Ag, Cr, Ni, Ne, Ar, Xe, and Kr), the composition ratios q and j preferably satisfy 52 atomic $\% \leq q+j \leq 60$ atomic %, and 0.2 atomic $\% \leq j \leq 10$ atomic %.

With the (q+j) value of less than 52 atomic % or over 60 atomic %, the crystal lattice of $Pt_qMn_{100-q-j}L_j$ cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio j of less than 0.2 atomic %, the effect of improving a unidirectional exchange coupling magnetic field is not sufficiently exhibited by adding element L, while with the composition ratio j of over 10 atomic %, the unidirectional exchange anisotropic magnetic field undesirably deteriorates.

FIG. 18 further indicates that where the antiferromagnetic layer of the bottom type spin-valve thin film magnetic element, i.e., the antiferromagnetic layer 2, and the antiferromagnetic layer of the top type spin-valve thin film magnetic element, i.e., the bias layers 6, are made of an alloy represented by the formula $X_mMn_{100-m}$ (wherein X is at least one element of Pt, Pd, Ir, Rh, Ru, and Os), the composition ratio m of each of the antiferromagnetic layer and the bias layers preferably satisfies 52 atomic $\% \leq m \leq 58$ atomic %.

With the composition ratio m of less than 52 atomic %, the crystal lattice of $X_mMn_{100-m}$ which constitutes the bias layer 6s, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio m of over 58 atomic %, the crystal lattice of $X_mMn_{100-m}$, which constitutes the antiferromagnetic layer 2, cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field cannot be exhibited.

Where the antiferromagnetic layer 2 and the bias layers 6 are made of an alloy represented by the formula $X_m Mn_{100-m}$, the composition ratio m of each of the antiferromagnetic layer and the bias layer more preferably satisfies 52 atomic % $\leq$ m $\leq$ 56.5 atomic %.

With the composition ratio m of less than 52 atomic %, the crystal lattice of $X_m Mn_{100-m}$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio m of over 56.5 atomic %, the exchange anisotropic magnetic field of the antiferromagnetic layer 2 produced in the first heat treatment at 245° C. is higher than that of the bias layers 6, but a difference therebetween is small. Therefore, in the second heat treatment at 270° C., the magnetization direction of the pinned magnetic layer 3 is oriented in the same direction as the free magnetic layer 5, and the magnetization directions of the free magnetic layer 5 and the pinned magnetic layer 3 cannot be easily crossed each other at right angles.

Where the antiferromagnetic layer 2 and the bias layers 6 are made of an alloy represented by the formula $X_m Mn_{100-m}$, the composition ratio m of each of the antiferromagnetic layer and the bias layer most preferably satisfies 52 atomic % $\leq$ m $\leq$ 55.2 atomic %.

With the composition ratio m of less than 52 atomic %, the crystal lattice of $X_m Mn_{100-m}$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio m of over 55.2 atomic %, the exchange anisotropic magnetic field of the antiferromagnetic layer 2 produced in the first heat treatment at 245° C. is higher than that of the bias layers 6, but a difference therebetween is small. Therefore, in the second heat treatment at 270° C., the magnetization direction of the pinned magnetic layer 3 is oriented in the same direction as the free magnetic layer 5, and the magnetization directions of the free magnetic layer 5 and the pinned magnetic layer 3 cannot be easily crossed each other at right angles.

Where the composition ratio m of each of the antiferromagnetic layer and the bias layer is in the range of 52 atomic % $\leq$ m $\leq$ 55.2 atomic %, the exchange anisotropic magnetic field produced in the antiferromagnetic layer by the first heat treatment is higher than that of the bias layers, and a difference between the exchange coupling magnetic fields of the antiferromagnetic layer and the bias layers after the second heat treatment becomes large. Therefore, with a signal magnetic field applied from the magnetic recording medium, the magnetization direction of the pinned magnetic layer 3 is pinned without being changed, and the magnetization direction of the free magnetic layer 5 can be smoothly changed.

Where the antiferromagnetic layer 2 and the bias layer 6 are made of an alloy represented by the formula $Pt_m Mn_{100-m-n} Z_n$ (wherein Z is at least one element of Pd, Ir, Rh, Ru, and Os), the composition ratios m and n preferably satisfy 52 atomic % $\leq$ m+n $\leq$ 58 atomic %, and 0.2 atomic % $\leq$ n $\leq$ 40 atomic %.

With the (m+n) value of less than 52 atomic %, the crystal lattice $Pt_m Mn_{100-m-n} Z_n$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the (m+n) value of over 58 atomic %, the crystal lattice $Pt_m Mn_{100-m-n} Z_n$, which constitutes the antiferromagnetic layer 2, cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field cannot be exhibited.

With the composition ratio n of less than 0.2 atomic %, the effect of improving the unidirectional exchange coupling magnetic field cannot be sufficiently exhibited by adding element Z, while with the composition ratio n of over 40 atomic %, the unidirectional exchange coupling magnetic field undesirably deteriorates.

Where the antiferromagnetic layer 2 and the bias layers 6 are made of an alloy represented by the formula $Pt_m Mn_{100-m-n} Z_n$, the composition ratios m and n more preferably satisfy 52 atomic % $\leq$ m+n $\leq$ 56.5 atomic %, and 0.2 atomic % $\leq$ n $\leq$ 40 atomic %.

With the (m+n) value of less than 52 atomic %, the crystal lattice of $Pt_m Mn_{100-m-n} Z_n$ cannot be easily ordered to a $L1_0$ type ordered lattice even by the second heat treatment at a heat treatment temperature of 27°° C., exhibiting no antiferromagnetic characteristic. Namely, undesirably, a unidirectional exchange coupling magnetic field cannot be exhibited.

With the (m+n) value of over 56.5 atomic %, the exchange anisotropic magnetic field of the antiferromagnetic layer 2 produced in the first heat treatment at 245° C. is higher than that of the bias layer 6, but a difference therebetween is small. Therefore, in the second heat treatment at 270° C., the magnetization direction of the pinned magnetic layer 3 is oriented in the same direction as the free magnetic layer 5, or the magnetization directions of the free magnetic layer 5 and the pinned magnetic layer 3 cannot be easily crossed each other at right angles.

With the ration of less than 0.2 atomic %, the effect of improving the unidirectional exchange coupling magnetic field is not sufficiently exhibited by adding element Z, while with the ratio of over 40 atomic %, the unidirectional exchange coupling magnetic field undesirably deteriorates.

Where the antiferromagnetic layer 2 and the bias layer 6 are made of an alloy represented by the formula $Pt_m Mn_{100-m-n} Z_n$, the composition ratios m and n more preferably satisfy 52 atomic % $\leq$ m+n $\leq$ 55.2 atomic %, and 0.2 atomic % $\leq$ n $\leq$ 40 atomic %.

With the (m+n) value of less than 52 atomic %, the crystal lattice of $Pt_m Mn_{100-m-n} Z_n$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the (m+n) value of over 55.2 atomic %, the exchange anisotropic magnetic field of the antiferromagnetic layer 2 produced in the first heat treatment at 245° C. is higher than that of the bias layer 6, but a difference therebetween is small. Therefore, in the second heat treatment at 270° C., the magnetization direction of the pinned magnetic layer 3 is oriented in the same direction as the free magnetic layer 5, or the magnetization directions of the free magnetic layer 5 and the pinned magnetic layer 3 cannot be easily crossed each other at right angles.

With the ratio n of less than 0.2 atomic %, the effect of improving the unidirectional exchange coupling magnetic field is not sufficiently exhibited by adding element Z, while with the ratio of over 40 atomic %, the unidirectional exchange coupling magnetic field undesirably deteriorates.

Where the composition ratios m and n of each of the antiferromagnetic layer 2 and the bias layer 6 satisfy 52 atomic % $\leq$ m+n $\leq$ 55.2 atomic %, and 0.2 atomic % $\leq$ n $\leq$ 40 atomic %, the exchange anisotropic magnetic field produced in the antiferromagnetic layer by the first heat treatment is higher than that of the bias layers 6, and a difference between the exchange coupling magnetic fields of the antiferromagnetic layer 2 and the bias layers 6 after the second heat treatment becomes large. Therefore, with a signal magnetic field applied from the magnetic recording medium, the magnetization direction of the pinned magnetic layer 3 is pinned without being changed, and the magnetization direction of the free magnetic layer 5 can be smoothly changed.

Where the antiferromagnetic layer 2 and the bias layers 6 are made of an alloy represented by the formula $Pt_q Mn_{100-q-j} L_j$ (wherein L is at least one element of Au, Ag, Cr, Ni, Ne, Ar, Xe, and Kr), the composition ratios q and j preferably satisfy 52 atomic % $\leq$ q+j $\leq$ 58 atomic %, and 0.2 atomic % $\leq$ j $\leq$ 10 atomic %.

With the (q+j) value of less than 52 atomic %, the crystal lattice of $Pt_q Mn_{100-q-j} L_j$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the (q+j) value of over 58 atomic %, the crystal lattice of $Pt_q Mn_{100-q-j} L_j$, which constitutes the antiferromagnetic layer 2, cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field cannot be exhibited.

With the composition ratio j of less than 0.2 atomic %, the effect of improving a unidirectional exchange coupling magnetic field is not sufficiently exhibited by adding element L, while with the composition ratio j of over 10 atomic %, the unidirectional exchange coupling magnetic field undesirably deteriorates.

Where the antiferromagnetic layer 2 and the bias layers 6 are made of an alloy represented by the formula $Pt_q Mn_{100-q-j} L_j$, the composition ratios q and j more preferably satisfy 52 atomic % $\leq$ q+j $\leq$ 56.5 atomic %, and 0.2 atomic % $\leq$ j $\leq$ 10 atomic %.

With the (q+j) value of less than 52 atomic %, the crystal lattice of $Pt_q Mn_{100-q-j} L_j$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the (q+j) value of over 56.5 atomic %, the exchange anisotropic magnetic field of the antiferromagnetic layer 2 produced in the first heat treatment at 245° C. is higher than that of the bias layers 6, but a difference therebetween is small. Therefore, in the second heat treatment at 270° C., the magnetization direction of the pinned magnetic layer 3 is oriented in the same direction as the free magnetic layer, and the magnetization directions of the free magnetic layer 5 and the pinned magnetic layer 3 cannot be easily crossed each other at right angles.

With the composition ratio j of less than 0.2 atomic %, the effect of improving the unidirectional exchange coupling magnetic field is not sufficiently exhibited by adding element L, while with the composition ratio j of over 10 atomic %, the unidirectional exchange coupling magnetic field undesirably deteriorates.

Where the antiferromagnetic layer 2 and the bias layers 6 are made of an alloy represented by the formula $Pt_q Mn_{100-q-j} L_j$, the composition ratios q and j more preferably satisfy 52 atomic % $\leq$ q+j $\leq$ 55.2 atomic %, and 0.2 atomic % $\leq$ j $\leq$ 10 atomic %.

With the (q+j) value of less than 52 atomic %, the crystal lattice of $Pt_q Mn_{100-q-j} L_j$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the (q+j) value of over 55.2 atomic %, the exchange anisotropic magnetic field of the antiferromagnetic layer 2 produced in the first heat treatment at 245° C. is higher than that of the bias layers 6, but a difference therebetween is small. Therefore, in the second heat treatment at 270° C., the magnetization direction of the pinned magnetic layer 3 is oriented in the same direction as the free magnetic layer 5, or the magnetization directions of the free magnetic layer 5 and the pinned magnetic layer 3 cannot be easily crossed each other at right angles.

With the composition ratio j of less than 0.2 atomic %, the effect of improving the unidirectional exchange coupling magnetic field is not sufficiently exhibited by adding element L, while with the composition ratio j of over 10 atomic %, the unidirectional exchange coupling magnetic field undesirably deteriorates.

Where the composition ratios q and j of the antiferromagnetic layer 2 and the bias layers 6 satisfy 52 atomic % $\leq$ q+j $\leq$ 55.2 atomic %, and 0.2 atomic % $\leq$ j $\leq$ 10 atomic %, the exchange anisotropic magnetic field produced in the antiferromagnetic layer 2 by the first heat treatment is higher than that of the bias layers 6, and a difference between the exchange coupling magnetic fields of the antiferromagnetic layer 2 and the bias layers 6 after the second heat treatment becomes large. Therefore, with a signal magnetic field applied from the magnetic recording medium, the magnetization direction of the pinned magnetic layer 3 is pinned without being changed, and the magnetization direction of the free magnetic layer 5 can be smoothly changed.

The composition of the antiferromagnetic layer of the bottom type spin-valve thin film element, i.e., the antiferromagnetic layer 2, and the composition of the antiferromagnetic layer of the top type spin-valve thin film element, i.e., the bias layers 6, may be controlled to different compositions so that, for example, the Mn concentration of the antiferromagnetic layer 2 is higher than the Mn concentration of the bias layers 6. In this case, a difference between both exchange coupling magnetic fields after the first heat treatment can be further increased, and then the magnetization directions of the free magnetic layer 5 and the pinned magnetic layer 3 can be securely crossed each other.

A difference between both exchange anisotropic magnetic fields of the antiferromagnetic layer 2 and the bias layers 6, which have different Mn concentrations, after the second heat treatment can be further increased. Therefore, with a signal magnetic field applied from the magnetic recording medium, the magnetization direction of the pinned magnetic layer 3 is pinned without being changed, and the magnetization direction of the free magnetic layer 5 can be smoothly changed.

Namely, preferably, the bias layers 6 are made of an alloy represented by the formula $X_m Mn_{100-m}$ (wherein X is at least one element of Pt, Pd, Ir, Rh, Ru, and Os, and the composition ratio m satisfies 52 atomic %≦m≦60 atomic %), and the antiferromagnetic layer 2 is made of an alloy represented by the formula $X_m Mn_{100-m}$ (wherein X is at least one element of Pt, Pd, Ir, Rh, Ru, and Os, and the composition ratio m satisfies 48 atomic %≦m≦58 atomic %).

With the composition ratio m of the bias layers 6 of less than 52 atomic % or over 60 atomic %, as shown in FIG. 18, the crystal lattice of $X_m Mn_{100-m}$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio m of the antiferromagnetic layer 2 of less than 48 atomic % or over 58 atomic %, the crystal lattice of $X_m Mn_{100-m}$, which constitutes the antiferromagnetic layer 2, cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field cannot be exhibited.

Therefore, the composition ratios of the antiferromagnetic layer 2 and the bias layers 6 are preferably selected from the ranges of 48 atomic %≦m≦58 atomic % and 52 atomic %≦m≦60 atomic %, respectively, so that the exchange anisotropic magnetic field of the antiferromagnetic layer 2 after the first heat treatment at the first heat treatment temperature of 245° C. is higher than that of the bias layers 6, and the exchange anisotropic magnetic field of the antiferromagnetic layer 2 after the second heat treatment at the second heat treatment temperature of 270° C. is also higher than that of the bias layers 6.

By respectively selecting the composition ratios in the different composition ranges to satisfy the above conditions, a combination of the antiferromagnetic layer 2 and the bias layers 6 can be appropriately selected so that a difference between both exchange anisotropic magnetic fields can be made significant after each of the first heat treatment and second heat treatment to improve the design freedom, as compared with cases in which the antiferromagnetic layer 2 and the bias layers 6 have the same composition.

Furthermore, the exchange anisotropic magnetic field of the antiferromagnetic layer 2 can be made higher than that of the bias layers 6 in the first heat treatment, and the magnetization directions of the free magnetic layer 5 and the pinned magnetic layer 3 can be crossed each other in the second heat treatment without deteriorating the exchange anisotropic magnetic field of the antiferromagnetic layer 2 or changing the magnetization direction thereof, while the magnetization direction of the pinned magnetic layer 3 remains strongly pinned.

Furthermore, after the second heat treatment, the exchange anisotropic magnetic field of the antiferromagnetic layer 2 can be made higher than that of the bias layers 6, and the magnetization direction of the free magnetic layer 5 can be smoothly changed with a signal magnetic field applied from the magnetic recording medium, while the magnetization direction of the pinned magnetic layer 3 is pinned without being changed.

In another preferred combination of the antiferromagnetic layer 2 and the bias layers 6, the bias layers 6 are made of an alloy represented by the formula $Pt_m Mn_{100-m-n} Z_n$ (wherein Z is at least one element of Pd, Ir, Rh, Ru, and Os, and composition ratios m and n satisfy 52 atomic %≦m+n≦60 atomic %, and 0.2 atomic %≦n≦40 atomic %), and the antiferromagnetic layer 2 is made of an alloy represented by the formula $Pt_m Mn_{100-m-n} Z_n$ (wherein Z is at least one element of Pd, Ir, Rh, Ru, and Os, and composition ratios m and n satisfy 48 atomic %≦m+n≦58 atomic %, and 0.2 atomic %≦n≦40 atomic %).

With the (m+n) value of the bias layers 6 of less than 52 atomic % or over 60 atomic %, the crystal lattice of $Pt_m Mn_{100-m-n} Z_n$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio n of the bias layers 6 of less than 0.2 atomic %, the effect of improving the unidirectional exchange coupling magnetic field cannot be sufficiently exhibited by adding element Z, while with the composition ratio n of over 40 atomic %, the unidirectional exchange coupling magnetic field undesirably deteriorates.

With the (m+n) value of the antiferromagnetic layer 2 of less than 48 atomic % or over 58 atomic %, the crystal lattice of $Pt_m Mn_{100-m-n} Z_n$, which constitutes the antiferromagnetic layer 2, cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field cannot be exhibited.

With the composition ratio n of the antiferromagnetic layer 2 of less than 0.2 atomic %, the effect of improving the unidirectional exchange coupling magnetic field cannot be sufficiently exhibited by adding element Z, while with the composition ratio n of over 40 atomic %, the unidirectional exchange coupling magnetic field undesirably deteriorates.

Therefore, the composition ratios of the antiferromagnetic layer 2 and the bias layers 6 are preferably selected from the ranges of 48 atomic %≦m+n≦58 atomic %, and 52 atomic %≦m+n≦60 atomic %, respectively, so that the exchange anisotropic magnetic field of the antiferromagnetic layer 2 after the first heat treatment at the first heat treatment temperature of 245° C. is higher than that of the bias layers 6, and the exchange anisotropic magnetic field of the antiferromagnetic layer 2 after the second heat treatment at the second heat treatment temperature of 270° C. is also higher than that of the bias layers 6.

By respectively selecting the composition ratios in the different composition ranges to satisfy the above conditions, a combination of the antiferromagnetic layer 2 and the bias layers 6 can be appropriately selected so that a difference between both exchange anisotropic magnetic fields can be made significant after each of the first heat treatment and second heat treatment to improve the design freedom, as compared with cases in which the antiferromagnetic layer 2 and the bias layers 6 have the same composition.

Furthermore, the exchange anisotropic magnetic field of the antiferromagnetic layer 2 can be made higher than that of the bias layers 6 in the first heat treatment, and the magnetization directions of the free magnetic layer 5 and the pinned magnetic layer 3 can be crossed each other in the second heat treatment without deteriorating the exchange anisotropic magnetic field of the antiferromagnetic layer 2 or changing the magnetization direction thereof, while the magnetization direction of the pinned magnetic layer 3 remains strongly pinned.

Furthermore, after the second heat treatment, the exchange anisotropic magnetic field of the antiferromagnetic layer 2 can be made higher than that of the bias layers 6, and the magnetization direction of the free magnetic layer 5 can be smoothly changed with a signal magnetic field applied from the magnetic recording medium, while the magnetization direction of the pinned magnetic layer 3 is pinned without being changed.

In a further preferred combination of the antiferromagnetic layer 2 and the bias layers 6, the bias layers 6 are made of an alloy represented by the formula $Pt_qMn_{100-q-j}L_j$ (wherein L is at least one element of Au, Ag, Cr, Ni, Ne, Ar, Xe, and Kr, and the composition ratios q and j satisfy 52 atomic $\% \leq q+j \leq 60$ atomic %, and 0.2 atomic $\% \leq j \leq 10$ atomic %), and the antiferromagnetic layer 2 is made of an alloy represented by the formula $Pt_qMn_{100-q-j}L_j$ (wherein L is at least one element of Au, Ag, Cr, Ni, Ne, Ar, Xe, and Kr, and the composition ratios q and j satisfy 48 atomic $\% \leq q+j \leq 58$ atomic %, and 0.2 atomic $\% \leq j \leq 10$ atomic %).

With the (q+j) value of the bias layer 6 of less than 52 atomic % or over 60 atomic %, the crystal lattice of $Pt_qMn_{100-q-j}L_j$, which constitutes the bias layers 6, cannot be easily ordered to a $L1_0$ type ordered lattice even by the second heat treatment at a heat treatment temperature of 270° C., exhibiting no antiferromagnetic characteristic. Namely, undesirably, a unidirectional exchange coupling magnetic field cannot be exhibited.

With the composition ratio j of the bias layers 6 of less than 0.2 atomic %, the effect of improving the unidirectional exchange coupling magnetic field cannot be sufficiently exhibited by adding element L, while with the composition ratio j of over 10 atomic %, the unidirectional exchange coupling magnetic field undesirably deteriorates.

With the (q+j) value of the antiferromagnetic layer 2 of less than 48 atomic % or over 58 atomic %, the crystal lattice of $Pt_qMn_{100-q-j}L_j$, which constitutes the antiferromagnetic layer 2, cannot be easily ordered to a $L1_0$ type ordered lattice even by the first heat treatment at a heat treatment temperature of 245° C., exhibiting no antiferromagnetic characteristic. Namely, undesirably, a unidirectional exchange coupling magnetic field cannot be exhibited.

With the composition ratio j of the antiferromagnetic layer 2 of less than 0.2 atomic %, the effect of improving the unidirectional exchange coupling magnetic field cannot be sufficiently exhibited by adding element L, while with the composition ratio j of over 10 atomic %, the unidirectional exchange coupling magnetic field undesirably deteriorates.

Therefore, the composition ratios of the antiferromagnetic layer 2 and the bias layers 6 are preferably selected from the ranges of 48 atomic $\% \leq q+j \leq 58$ atomic %, and 52 atomic $\% \leq q+j \leq 60$ atomic %, respectively, so that the exchange anisotropic magnetic field of the antiferromagnetic layer 2 after the first heat treatment at the first heat treatment temperature of 245° C. is higher than that of the bias layers 6, and the exchange anisotropic magnetic field of the antiferromagnetic layer 2 after the second heat treatment at the second heat treatment temperature of 270° C. is also higher than that of the bias layers 6.

By respectively selecting the composition ratios in the different composition ranges to satisfy the above conditions, a combination of the antiferromagnetic layer 2 and the bias layers 6 can be appropriately selected so that a difference between both exchange anisotropic magnetic fields can be made significant after each of the first heat treatment and second heat treatment to improve the design freedom, as compared with cases in which the antiferromagnetic layer 2 and the bias layers 6 have the same composition.

Furthermore, the exchange anisotropicimagnetic field of the antiferromagnetic layer 2 can be made higher than that of the bias layers 6 in the first heat treatment, and the magnetization directions of the free magnetic layer 5 and the pinned magnetic layer 3 can be crossed each other in the second heat treatment without deteriorating the exchange anisotropic magnetic field of the antiferromagnetic layer 2 or changing the magnetization direction thereof, while the magnetization direction of the pinned magnetic layer 3 remains strongly pinned.

Furthermore, after the second heat treatment, the exchange anisotropic magnetic field of the antiferromagnetic layer 2 can be made higher than that of the bias layers 6, and the magnetization direction of the free magnetic layer 5 can be smoothly changed with a signal magnetic field applied from the magnetic recording medium, while the magnetization direction of the pinned magnetic layer 3 is pinned without being changed.

In the spin-valve thin film magnetic element 1, the free magnetic layer 5 comprises the concave 5B comprising the track groove 5A having a width corresponding to the track width Tw, which is provided on the side opposite to the pined magnetic layer 3 side (or the side opposite to the substrate K side), and thus the track width Tw can be precisely determined according to the width of the concave 5B.

In manufacturing the spin-valve thin film magnetic element 1, the bias layers 6 are provided on the flat portions 5C of the free magnetic layer 5 on both sides of the concave 5B without remaining in the concave 5B, thereby providing the spin-valve thin film magnetic element 1 having excellent sensitivity in which the magnetic moment of the free magnetic layer 5 is smoothly rotated with a weak leakage magnetic flux from the magnetic recording medium.

Since each of the antiferromagnetic layer 2 and the bias layers 6 is made of an alloy comprising Mn and at least one element of Pt, Pd, Rh, Ru, Ir, Os, Au, Ag, Cr, and Ni, the spin-valve thin film magnetic element 1 has good temperature characteristics of an exchange anisotropic magnetic field, and excellent heat resistance.

When the spin-valve thin film magnetic element 1 is provided in a thin film magnetic head in which the element is heated to high temperature due to the environmental temperature in a device such as a hard disk, and Joule heat of a sensing current flowing through the element, good durability is obtained, and an exchange anisotropic magnetic field (exchange coupling magnetic field) less changes with changes in temperature.

Furthermore, since the antiferromagnetic layer 2 is made of the above-described alloy, the blocking temperature is increased, and a high exchange anisotropic magnetic field can be produced in the antiferromagnetic layer 2 so that the magnetization direction of the pinned magnetic layer 3 can be strongly pinned.

The method of manufacturing the spin-valve thin film magnetic element 1 uses the alloy comprising Mn and at least one element of Pt, Pd, Rh, Ru, Ir, Os, Au, Ag, Cr, and Ni for each of the antiferromagnetic layer 2 and the bias layers 6, and employs the properties of the alloy to pin the magnetization direction of the pinned magnetic layer 3 in the first heat treatment, and orient the magnetization direction of the free magnetic layer 5 in the direction perpendicular to the magnetization direction of the pinned magnetic layer 3 in the second heat treatment. Therefore, the magnetization direction of the free magnetic layer 5 can be oriented in the direction perpendicular to the magnetization direction of the pinned magnetic layer 3 without adversely affecting the magnetization direction of the pinned magnetic layer 3, and the spin-valve thin film magnetic element 1 having excellent heat treatment can be obtained.

The manufacturing method comprises depositing in turn the antiferromagnetic layer 2, the pinned magnetic layer 3, the nonmagnetic conductive layer 4, the free magnetic layer 5, and the bias layers 6 on the substrate to form the lamination a1, and then heat-treating the lamination a1. Therefore, in forming the lamination a1, the surface of each of the layers formed between the substrate K and the bias layers 6 is not exposed to air, and thus need not be cleaned by ion milling or reverse sputtering before upper layers are formed thereon apart from cases in which the surface of each of the layers is exposed to air. This can simplify the manufacturing method, and improve reproducibility. Since the surface of each of the layers need not be cleaned by ion milling or reverse sputtering, the manufacturing method is excellent because it causes no problem resulting from cleaning, such as contamination with materials adhering to the surfaces, the adverse affect of a disordered surface crystal state on the occurrence of an exchange anisotropic magnetic field, etc.

Furthermore, a portion of the bias layer 6 is removed to form the concave 6A having a width close to the track width Tw, and form the track groove 5A having a width corresponding to the track width Tw in the portion of the free magnetic layer 5, which is located below the concave 6A. Therefore, even with variation in the thickness of the bias layers 6, the bias layers 6 are not left at the bottom 5D of the track groove 5A, and thus the track width Tw can be precisely defined, thereby obtaining the spin-valve thin film magnetic element 1 adaptable to higher density recording. Since the bias layers can easily completely be removed, the manufacture of the element can be facilitated.

The thin film magnetic head comprising the spin-valve thin film magnetic element 1 provided on the slider 151 has excellent durability and heat resistance, and produces a sufficient exchange anisotropic magnetic field.

Although, in the spin-valve thin film magnetic element 1 of the first embodiment of the present invention, as described above, each of the pinned magnetic layer 3 and the free magnetic layer 5 provided above and below the nonmagnetic conductive layer 4 has a single layer structure, a multilayer structure may be used.

A mechanism exhibiting a giant magnetoresistive change is due to spin-dependent scattering of conduction electrons produced in the interfaces between the nonmagnetic conductive layer 4, the pinned magnetic layer 3 and the free magnetic layer 5. An example of combinations that cause a high degree of spin-dependent scattering comprises the nonmagnetic conductive layer 4 of Cu or the like, and a Co layer. Therefore, with the pinned magnetic layer 3 made of a material other than Co, the nonmagnetic conductive layer 4 side of the pinned magnetic layer 3 preferably comprises a Co thin layer 3a, as shown by a two-dot chain line in FIG. 1. With the free magnetic layer 5 made of a material other than Co, such as a NiFe alloy, a CoNi alloy, a CoFe alloy, or a CoFeNi alloy, like the pinned magnetic layer 3, the nonmagnetic conductive layer 4 side of the free magnetic layer 5 preferably comprises a Co thin layer 5a, as shown by a two-dot chain line in FIG. 1.

Second Embodiment

Figure 8:
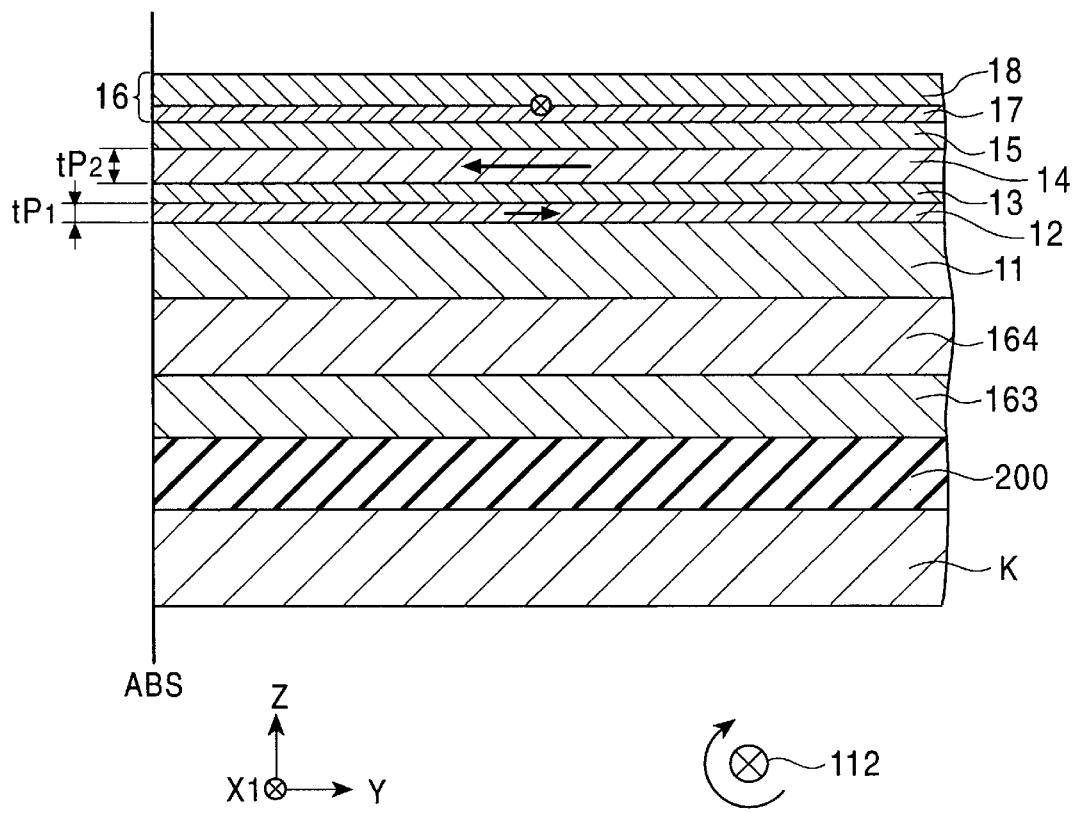
FIG. 8 is a sectional view showing a spin-valve thin film magnetic element according to a second embodiment of the present invention.
Figure 9:
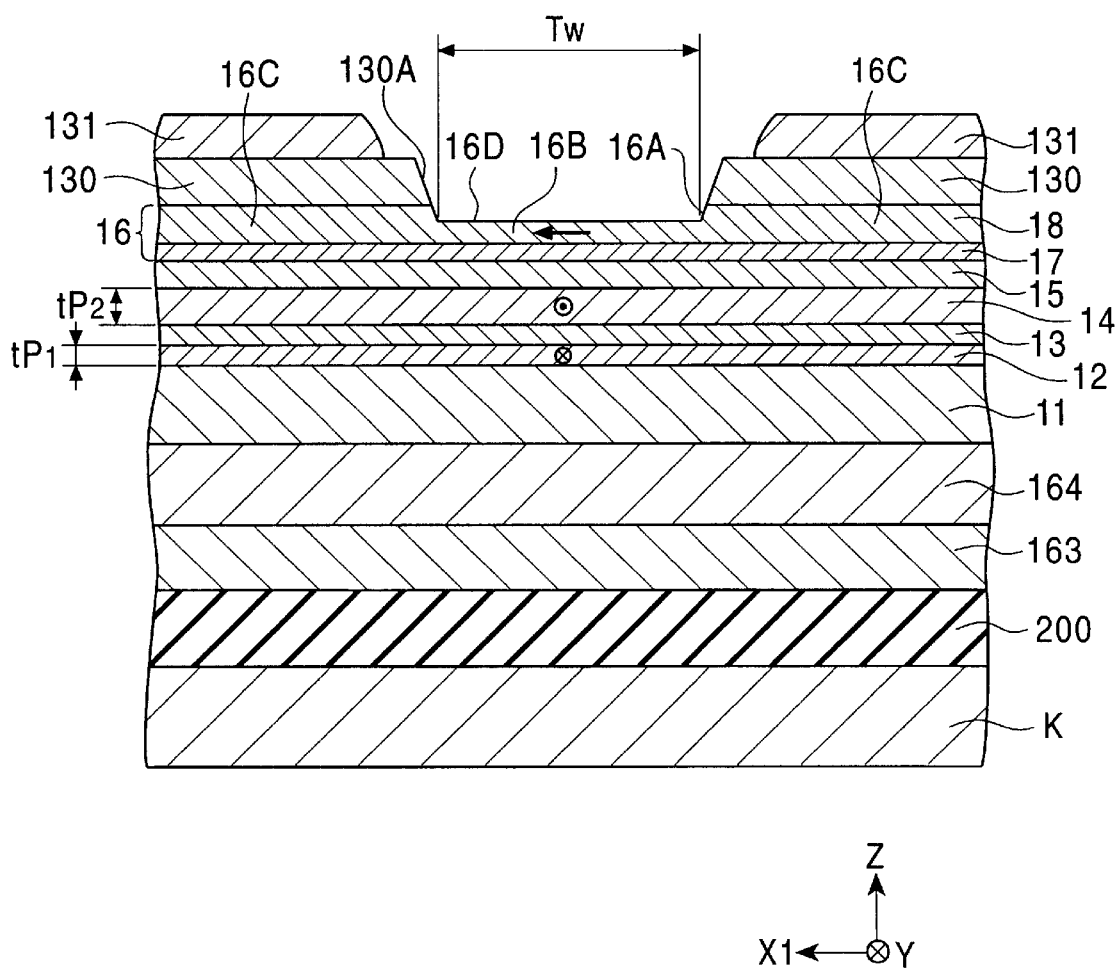
FIG. 9 is a sectional view showing the structure of the spin-valve thin film magnetic element shown in FIG. 8, as viewed from the side facing a recording medium.

FIG. 8 is a cross-sectional view schematically showing a spin-valve thin film magnetic element of a second embodiment of the present invention, and FIG. 9 is a sectional view showing the structure of the spin-valve thin film magnetic element shown in FIG. 8, as viewed from the side facing a recording medium.

Like the spin-valve thin film element shown in FIG. 1, the spin-valve thin film magnetic element of this embodiment is provided on the trailing-side end of a floating slider provided on a hard disk device, for detecting a recording magnetic field of a hard disk or the like.

The movement direction of the magnetic recording medium such as the hard disk coincides with the Z direction shown in the drawing, and a leakage magnetic field from the magnetic recording medium coincides with the Y direction.

The spin-valve thin film magnetic element shown in FIGS. 8 and 9 is a so-called bottom type single spin-valve thin film magnetic element comprising an antiferromagnetic layer, a pinned magnetic layer, a nonmagnetic conductive layer, and a free magnetic layer.

Like in the spin-valve thin film magnetic element shown in FIG. 1, in the spin-valve thin film magnetic element, the magnetization direction of the free magnetic layer is oriented in the direction perpendicular to the magnetization direction of the pinned magnetic layer by an exchange bias system using bias layers made of an antiferromagnetic material.

In FIGS. 8 and 9, reference character K denotes a substrate on which a base insulating layer 200 made of $Al_2O_3$, a lower shield layer 163, a lower gap layer 164, and an antiferromagnetic layer 11 are formed. Furthermore, a first pinned magnetic layer 12 is formed on the antiferromagnetic layer 11, a nonmagnetic intermediate layer 13 is formed on the first pinned magnetic layer 12, and a second pinned magnetic layer 14 is formed on the nonmagnetic intermediate layer 13. A nonmagnetic conductive layer 15 is formed on the second pinned magnetic layer 14, and a free magnetic layer 16 is formed on the nonmagnetic conductive layer 15. The free magnetic layer 16 comprises a groove 16B comprising a track groove 16A having the same width as the track width Tw, and flat portions 16C on both sides of the groove 16B, which are provided on the side opposite to the pinned magnetic layer side (or opposite to the substrate K side), as shown in FIG. 9.

Furthermore, bias layers 130 are respectively provided on the flat portions 16C of the free magnetic layer 16, and conductive layers 131 are respectively formed on the bias layers 130.

Like in the spin-valve thin film magnetic element of the first embodiment, in the spin-valve thin film magnetic element of the second embodiment, the antiferromagnetic layer 11 preferably comprises an alloy containing Mn and at least one element of Pt, Pd, Ir, Rh, Ru, Os, Au, Ag, Cr, and Ni, and is provided for magnetizing the first and second pinned magnetic layers 12 and 14 in respective predetermined directions by heat treatment in a magnetic field.

Each of the first and second pinned magnetic layers 12 and 14 comprises, for example, a Co film, a NiFe alloy film, a CoNiFe alloy film, a CoFe alloy film, or the like.

The nonmagnetic intermediate layer 13 interposed between the first and second pinned magnetic layers 12 and 14 preferably comprises an alloy composed of at least one of Ru, Rh, Ir, Cr, Re, and Cu.

In FIG. 8, an arrow shown in each of the first and second pinned magnetic layers 12 and 14 represents the magnitude and direction of magnetic moment, the magnitude of magnetic moment being determined by the product of saturation magnetization (Ms) and thickness (t).

The first and second pinned magnetic layers 12 and 14 shown in FIGS. 8 and 9 are made of the same material, and the thickness $tP_2$ of the second pinned magnetic layer 14 is larger than the thickness $tP_1$ of the first pinned magnetic layer 12. Therefore, the magnetic moment of the second pinned magnetic layer 14 is higher than that of the first pinned magnetic layer 12.

The first and second pinned magnetic layers 12 and 14 preferably have different magnetic moments. Therefore, the thickness $tP_1$ of the first pinned magnetic layer 12 may be larger than the thickness $tP_2$ of the second pinned magnetic layer 14.

As shown in FIGS. 8 and 9, the first pinned magnetic layer 12 is magnetized in the direction (the height direction) away from the recording medium, and the second pinned magnetic layer 14 opposed to the first pinned magnetic layer 12 with the nonmagnetic intermediate layer 13 provided therebetween is magnetized in antiparallel (ferrimagnetic state) with the magnetization direction of the first pinned magnetic layer 12.

The first pinned magnetic layer 12 is formed in contact with the antiferromagnetic layer 11, and is annealed (heat-treated) in a magnetic field to produce an exchange coupling magnetic field (exchange anisotropic magnetic field) in the interface between the first pinned magnetic layer 12 and the antiferromagnetic layer 11 so that magnetization of the first pinned magnetic layer 12 is pinned in the Y direction, for example, as shown in FIGS. 8 and 9. When the magnetization of the first pinned magnetic layer 12 is pinned in the Y direction, magnetization of the second pinned layer 14 opposed to the first pinned magnetic layer 12 with the nonmagnetic intermediate layer 13 provided therebetween is pinned in an antiparallel state (ferrimagnetic state) with the magnetization of the first pinned magnetic layer 12.

In this spin-valve thin film magnetic element, the magnetization directions of the first and second pinned magnetic layers 12 and 14 can be more stably maintained in the antiparallel state as the exchange coupling magnetic field increases. In the spin-valve thin film magnetic element of this embodiment, the alloy, which has a high blocking temperature and produces a high exchange coupling magnetic field (exchange anisotropic magnetic field) in the interface with the first pinned magnetic layer 12, is used for the antiferromagnetic layer 11 so that the magnetization states of the first and second pinned magnetic layers 12 and 14 can be thermally stably maintained.

As described above, in the spin-valve thin film magnetic element, the thickness ratio between the first and second pinned magnetic layers 12 and 14 is set in an appropriate range to increase the exchange coupling magnetic field (Hex). Therefore, it is possible to maintain the magnetization states of the first and second pinned magnetic layers 12 and 14 in the thermally stable antiparallel state (ferrimagnetic state), and obtain good ΔMR (rate of change in resistance).

As shown in FIGS. 8 and 9, the nonmagnetic conductive layer 15 made of Cu or the like is formed on the second pinned magnetic layer 14, and the free magnetic layer 16 is further formed on the nonmagnetic conductive layer 15.

As shown in FIGS. 8 and 9, the free magnetic layer 16 comprises two layers including a layer 17 comprising a Co film and formed on the side in contact with the nonmagnetic conductive layer 15. The other layer 18 comprises a NiFe alloy, a CoFe alloy, or a CoNiFe alloy.

The reasons for forming the layer 17 comprising a Co film on the side in contact with the nonmagnetic conductive layer 15 are that diffusion of metal elements in the interface with the nonmagnetic conductive layer 15 of Cu can be prevented, and ΔMR (rate of change in resistance) can be increased.

Like the antiferromagnetic layer 11, the bias layers 130 are made of an alloy containing Mn and at least one element of Pt, Pd, Ir, Rh, Ru, Os, Au, Ag, Cr, Ni, Ne, Ar, Xe, and Kr.

The free magnetic layer 16 is magnetized in the X1 direction shown in the drawings by the effect of a biased magnetic field of the bias layers 130.

The conductive layers 131 are preferably made of Au, W, Cr, Ta, or the like.

In the spin-valve thin film magnetic element 1 shown in FIGS. 8 and 9, a sensing current is supplied to the free magnetic layer 16, the nonmagnetic conductive layer 15, and the second pinned magnetic layer 14 from the conductive layers 131. When a magnetic field is applied from the recording medium in the Y direction shown in FIGS. 8 and 9, the magnetization direction of the free magnetic layer 16 is changed from the X1 direction to the Y direction to cause spin-dependent scattering of conduction electrons in the interface between the nonmagnetic conductive layer 15 and the free magnetic layer 16 and the interface between the nonmagnetic conductive layer 15 and the second pinned magnetic layer 14 so that a leakage magnetic field from the recording medium can be detected by a change in electric resistance.

In fact, the sensing current also flows to the interface between the first pinned magnetic layer 12 and the nonmagnetic intermediate layer 13. The first pinned magnetic layer 12 is a layer which does not directly concern ΔMR, and which has the auxiliary function to pin the second pinned magnetic layer 14 concerning ΔMR in a proper direction.

Therefore, the sensing current flows to the first pinned magnetic layer 12 and the nonmagnetic intermediate layer 13 to cause a shunt loss (current loss). However, in the second embodiment, the amount of the shunt loss is very small, and substantially the same degree of ΔMR as conventional elements can be obtained.

The spin-valve thin film magnetic element of this embodiment can be manufactured by substantially the same manufacturing method as the spin-valve thin film magnetic element shown in FIG. 1.

Namely, the method of manufacturing the spin-valve thin film magnetic element of the present invention comprises depositing in turn the antiferromagnetic layer 11, the first pinned magnetic layer 12, the nonmagnetic intermediate layer 13, the second pinned magnetic layer 14, the nonmagnetic conductive layer 15, the free magnetic layer 16 and the bias layers 130 on the substrate K to form the lamination, and then heat-treating the lamination at the first heat treatment temperature while applying the first magnetic field to the lamination in the direction perpendicular to the direction of the track width Tw to produce an exchange anisotropic magnetic field in each of the antiferromagnetic layer 11 and the bias layers 130 so that the magnetization directions of the first pinned magnetic layer 12 and the free magnetic layer 16 are pinned in the same direction, and the exchange anisotropic magnetic field of the antiferromagnetic layer 11 is higher than that of the bias layers 130.

Then, the lamination is heat-treated at the second heat treatment temperature higher than the first heat treatment temperature with the second magnetic field higher than the exchange anisotropic magnetic field of the bias layers 130 and lower than that of the antiferromagnetic layer 11 to apply a biased magnetic field to the free magnetic layer 16 in the direction perpendicular to the magnetization directions of the first and second pinned magnetic layers 12 and 14.

Then, a portion of the bias layers 130 of the heat-treated lamination is removed by ion milling to form a concave 130A having a width close to the track width Tw, and form a track groove 16A having a width corresponding to the track width Tw in a portion of the free magnetic layer 16, which is located below the concave 130A.

Then, the conductive layers 131 are formed on the bias layers 130 by a method using lift off resist, for supplying the sensing current to the free magnetic layer 16, to obtain the spin-valve thin film magnetic element.

In the spin-valve thin film magnetic element, the free magnetic layer 16 has a groove 16B comprising the track groove 16A having a width corresponding to the track width Tw on the side opposite to the pinned magnetic layer side (or the side opposite to the substrate K side), and thus the track width Tw can be precisely determined according to the width of the groove 16B.

In manufacturing the spin-valve thin film magnetic element, the bias layers 130 provided on the flat portions 16C of the free magnetic layer 16 on both sides of the groove 16B are not left in the groove 16B, thereby providing the spin-valve thin film magnetic element with excellent sensitivity in which magnetic moment of the free magnetic layer 16 is smoothly rotated with a weak leakage magnetic field from the magnetic recording medium.

In the spin-valve thin film magnetic element of this embodiment, since each of the antiferromagnetic layer 11 and the bias layers 130 is made of an alloy comprising Mn and at least one element of Pt, Pd, Rh, Ru, Ir, Os, Au, Ag, Cr, Ni, Ne, Ar, Xe, and Kr, the spin-valve thin film magnetic element has good temperature characteristics of an exchange anisotropic magnetic field, and excellent heat resistance.

When the spin-valve thin film magnetic element is provided in a thin film magnetic head in which the element is heated to high temperature due to the environmental temperature in a device such as a hard disk, and Joule heat of a sensing current flowing through the element, good durability is obtained, and an exchange anisotropic magnetic field (exchange coupling magnetic field) less changes with changes in temperature.

Furthermore, since the antiferromagnetic layer 11 is made of the above-described alloy, the blocking temperature is increased, and a high exchange anisotropic magnetic field can be produced in the antiferromagnetic layer 11 so that the magnetization directions of the first and second pinned magnetic layers 12 and 14 can be strongly pinned.

The method of manufacturing the spin-valve thin film magnetic element uses the alloy comprising Mn and at least one element of Pt, Pd, Rh, Ru, Ir, Os, Au, Ag, Cr, Ni, Ne, Ar, Xe, and Kr for each of the antiferromagnetic layer 11 and the bias layers 130, and employs the properties of the alloy to pin the magnetization directions of the first pinned magnetic layer 12 in the first heat treatment, and orient the magnetization direction of the free magnetic layer 16 in the direction perpendicular to the magnetization directions of the first and second pinned magnetic layers 12 and 14 in the second heat treatment. Therefore, the magnetization direction of the free magnetic layer 16 can be oriented in the direction perpendicular to the magnetization directions of the first and second pinned magnetic layers 12 and 14 without adversely affecting the magnetization direction of the first pinned magnetic layer 12, and the spin-valve thin film magnetic element having excellent heat treatment can be obtained.

The manufacturing method comprises depositing in turn the antiferromagnetic layer 11, the first pinned magnetic layer 12, the nonmagnetic intermediate layer 13, the second pinned magnetic layer 14, the nonmagnetic conductive layer 15, the free magnetic layer 16, and the bias layers 130 on the substrate to form the lamination, and then heat-treating the lamination. Therefore, in forming the lamination, the surface of each of the layers formed between the substrate K and the bias layers 130 is not exposed to air, and thus need not be cleaned by ion milling or reverse sputtering before upper layers are formed thereon apart from cases in which the surface of each of the layers is exposed to air. This can simplify the manufacturing method, and improve reproducibility. Since the surface of each of the layers need not be cleaned by ion milling or reverse sputtering, the manufacturing method is excellent because it causes no problem resulting from cleaning, such as contamination with materials adhering to the surfaces, the adverse affect of a disordered surface crystal state on the occurrence of an exchange anisotropic magnetic field, etc.

Furthermore, a portion of the bias layers 130 is removed to form the concave 130A having a width close to the track width Tw, and form the track groove 16A having a width corresponding to the track width Tw in the portion of the free magnetic layer 16, which is located below the concave 130A. Therefore, even with variation in the thickness of the bias layers 130, the bias layers 130 are not left at the bottom 16D of the track groove 16A, and thus the track width Tw can be precisely defined, thereby obtaining the spin-valve thin film magnetic element adaptable to higher density recording. Since the bias layers 130 can easily completely be removed, the manufacture of the element can be facilitated.

Third Embodiment

Figure 10:
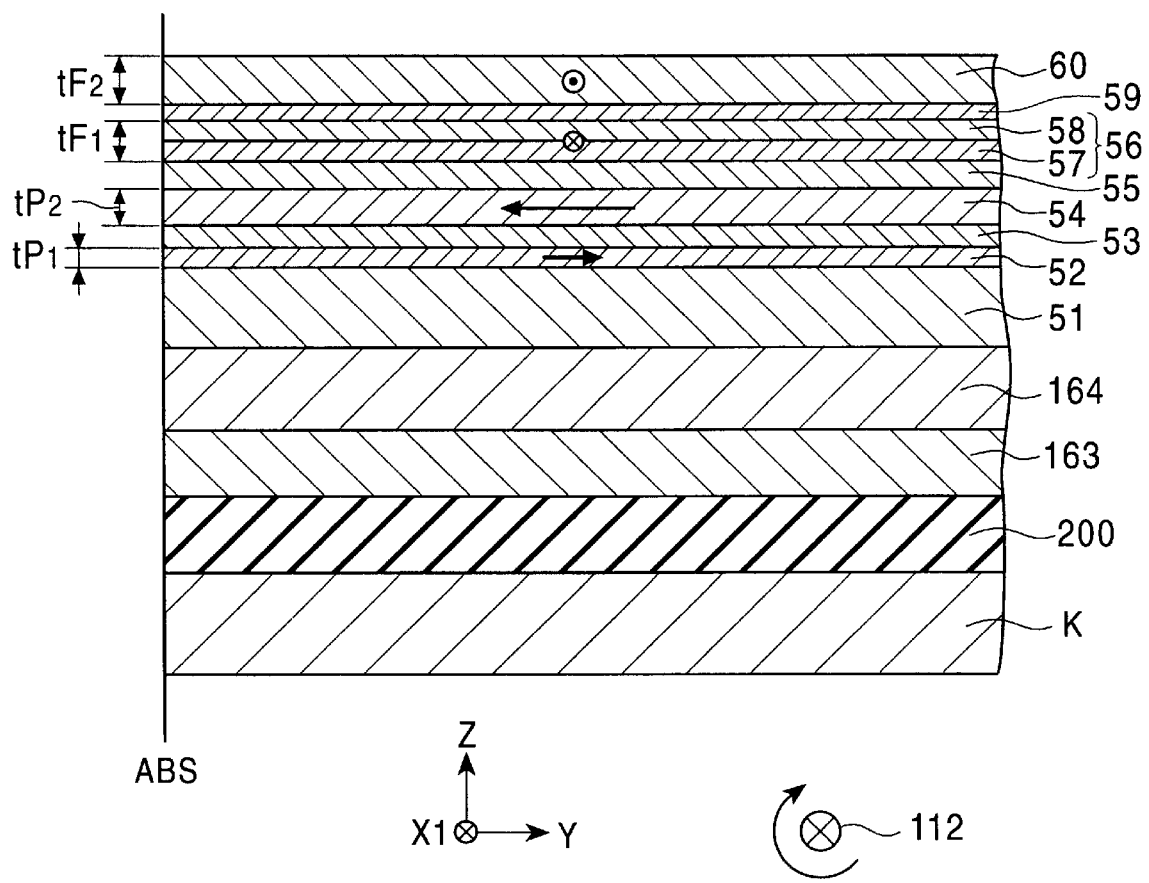
FIG. 10 is a sectional view showing a spin-valve thin film magnetic element according to a third embodiment of the present invention.
Figure 11:
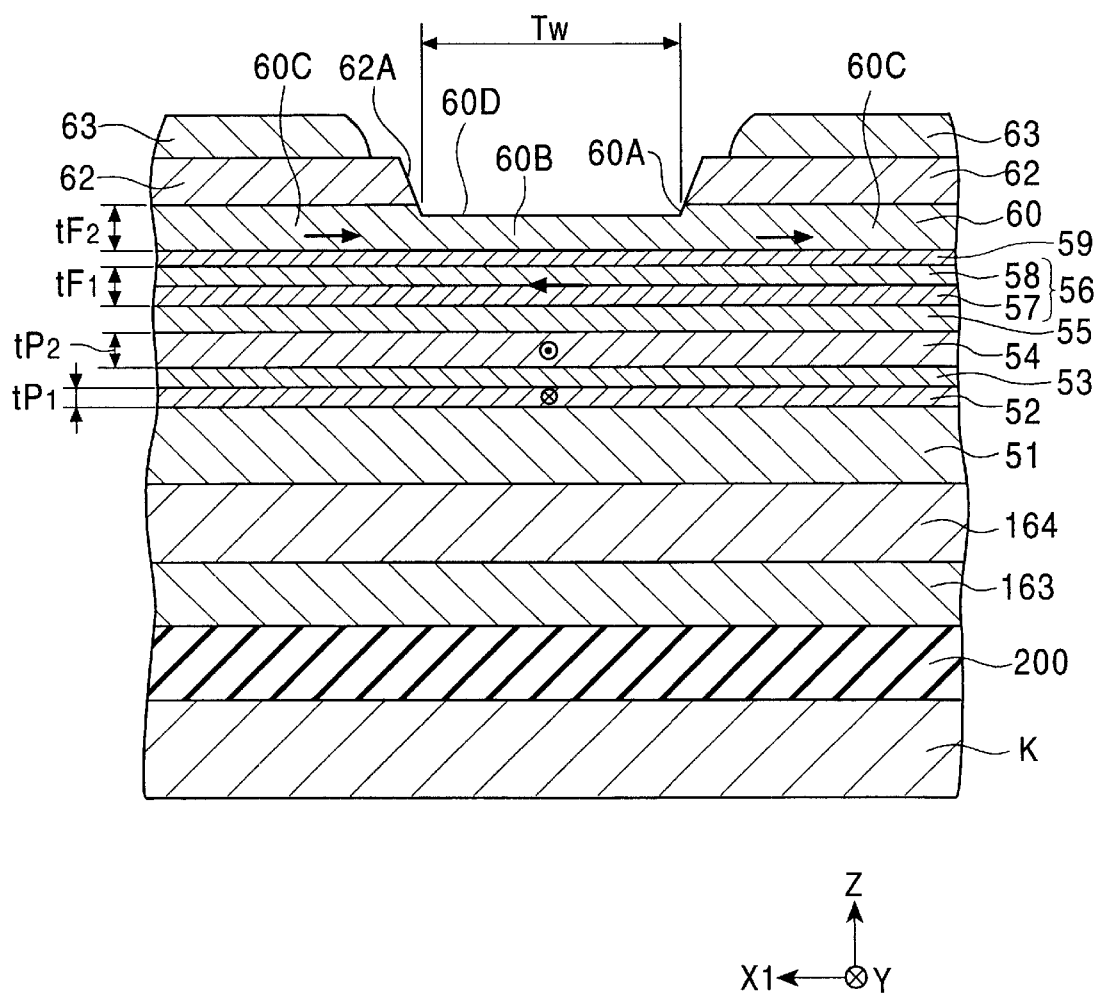
FIG. 11 is a sectional view showing the structure of the spin-valve thin film magnetic element shown in FIG. 10, as viewed from the side facing a recording medium.
Figure 12:
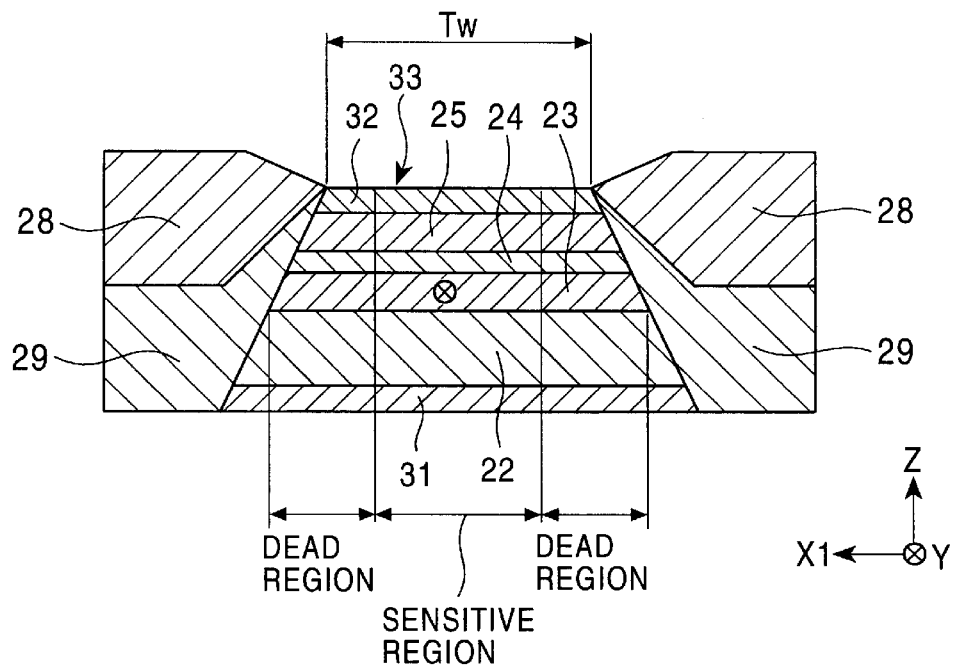
FIG. 12 is a sectional view showing the structure of an example of conventional spin-valve thin film magnetic elements, as viewed from the side facing a recording medium.
Figure 13:
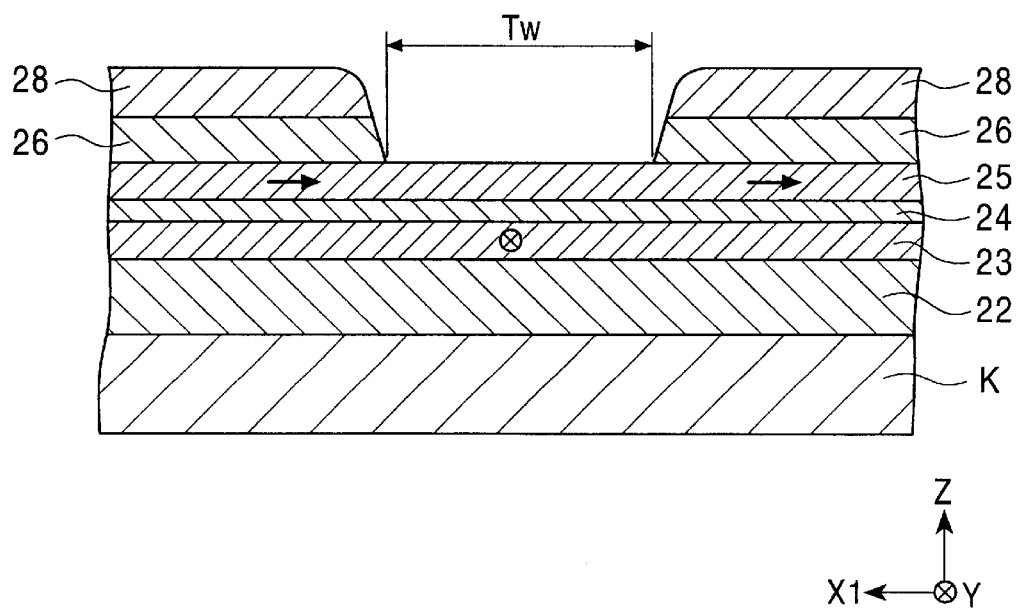
FIG. 13 is a sectional view showing the structure of another example of conventional spin-valve thin film magnetic elements, as viewed from the side facing a recording medium.
Figure 16:
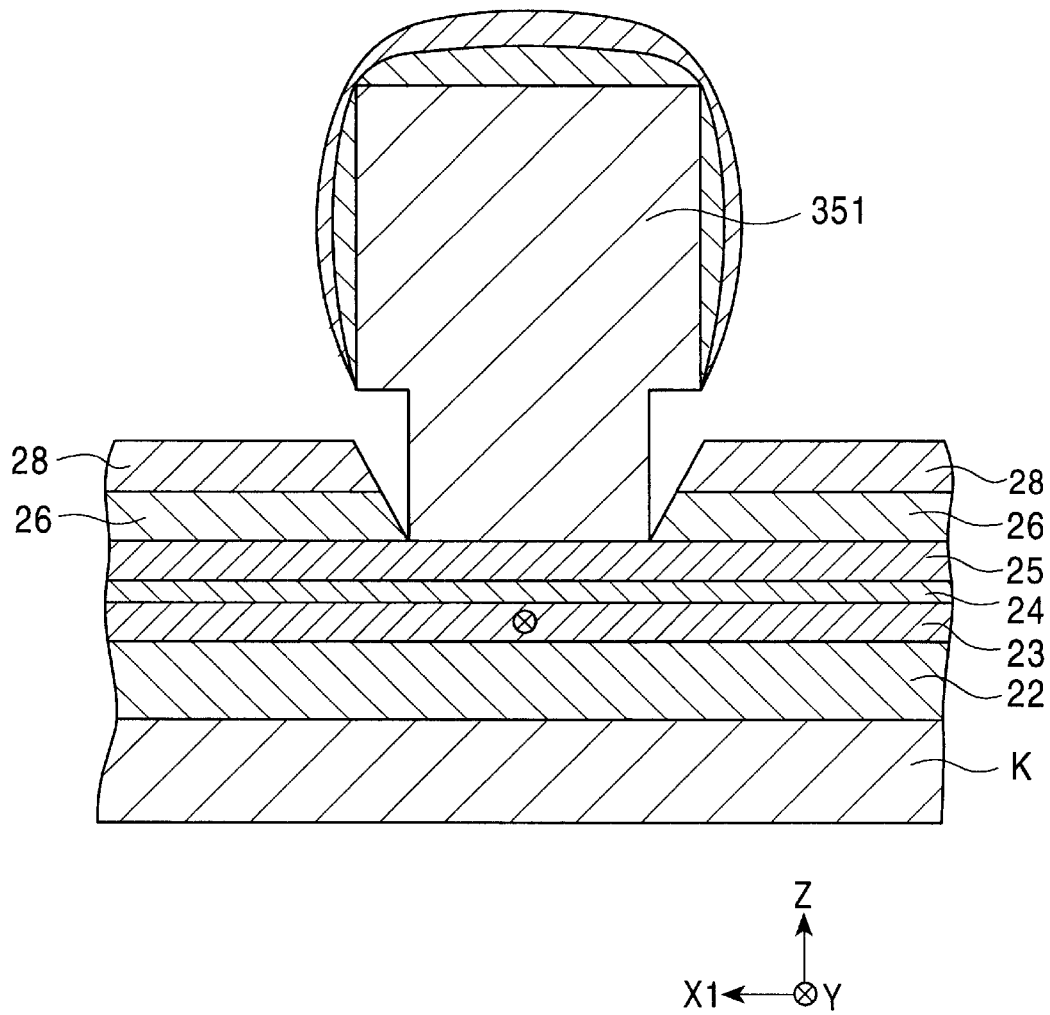
FIG. 16 is a sectional view illustrating a step of the method of manufacturing the spin-valve thin film magnetic element shown in FIG. 13, in which bias layers and conductive layers are formed.

FIG. 10 is a cross-sectional view schematically showing a spin-valve thin film magnetic element of a third embodiment of the present invention, and FIG. 11 is a sectional view showing the structure of the spin-valve thin film magnetic element shown in FIG. 10, as viewed from the side facing a recording medium.

Like the above-described spin-valve thin film elements, the spin-valve thin film magnetic element of this embodiment is provided on the trailing-side end of a floating slider provided on a hard disk device, for detecting a recording magnetic field of a hard disk or the like.

The movement direction of the magnetic recording medium such as the hard disk coincides with the Z direction shown in the drawings, and a leakage magnetic field from the magnetic recording medium coincides with the Y direction.

In the spin-valve thin film magnetic element of this embodiment, the magnetization direction of a free magnetic layer is oriented in the direction perpendicular to the magnetization direction of a pinned magnetic layer by an exchange bias system using bias layers made of an antiferromagnetic material.

In the spin-valve thin film magnetic element, not only the pinned magnetic layer but also the free magnetic layer are divided into two layers including first and second layers with a nonmagnetic intermediate layer provided therebetween.

In FIGS. 10 and 11, reference character K denotes a substrate on which a base insulating layer 200 made of $Al_2O_3$, a lower shield layer 163, a lower gap layer 164, and an antiferromagnetic layer 51 are formed. Furthermore, a first pinned magnetic layer 52, a nonmagnetic intermediate layer 53, a second pinned magnetic layer 54, a nonmagnetic conductive layer 55, a first free magnetic layer 56, a nonmagnetic intermediate layer 59, and a second free magnetic layer 60 are formed in turn on the antiferromagnetic layer 51.

The second free magnetic layer 60 comprises a groove 60B comprising a track groove 60A having the same width as the track width Tw, and flat portions 60C on both sides of the groove 60B, which are provided on the side opposite to the pinned magnetic layer side (or opposite to the substrate K side), as shown in FIG. 11.

Furthermore, bias layers 62 are respectively provided on the flat portions 60C of the second free magnetic layer 60, and conductive layers 63 are respectively formed on the bias layers 62.

In the spin-valve thin film magnetic element of the third embodiment, the antiferromagnetic layer 51 preferably comprises an alloy containing Mn and at least one element of Pt, Pd, Ir, Rh, Ru, Os, Au, Ag, Cr, Ni, Ne, Ar, Xe, and Kr, and is provided for magnetizing the first and second pinned magnetic layer 52 and 54 in respective predetermined directions by heat treatment in a magnetic field.

Each of the first and second pinned magnetic layers 52 and 54 comprises, for example, a Co film, a NiFe alloy film, a CoFe alloy film, a CoNiFe alloy film, or the like.

The nonmagnetic intermediate layer 53 preferably comprises an alloy composed of at least one of Ru, Rh, Ir, Cr, Re, and Cu.

The first pinned magnetic layer 52 is formed in contact with the antiferromagnetic layer 51, and is annealed (heat-treated) in a magnetic field to produce an exchange coupling magnetic field (exchange anisotropic magnetic field) in the interface between the first pinned magnetic layer 52 and the antiferromagnetic layer 51 so that magnetization of the first pinned magnetic layer 52 is pinned in the Y direction, for example, as shown in FIGS. 10 and 11. When the magnetization of the first pinned magnetic layer 52 is pinned in the Y direction, magnetization of the second pinned layer 54 opposed to the first pinned magnetic layer 52 with the nonmagnetic intermediate layer 53 provided therebetween is pinned in an antiparallel state (ferrimagnetic state) with the magnetization of the first pinned magnetic layer 52.

In order to maintain the stability of the ferrimagnetic state, a high exchange coupling magnetic field is required. In the spin-valve thin film magnetic element of this embodiment, the alloy, which has a high blocking temperature and produces a high exchange coupling magnetic field (exchange anisotropic magnetic field) in the interface with the first pinned magnetic layer 52, is used for the antiferromagnetic layer 51 so that the magnetization state of the first and second pinned magnetic layers 52 and 54 can be thermally stably maintained.

The nonmagnetic conductive layer 55 is preferably made of Cu or the like.

As shown in FIGS. 10 and 11, the first free magnetic layer 56 comprises two layers including a Co film 57 formed on the side in contact with the nonmagnetic conductive layer 55. The reason for forming the Co film 57 on the side in contact with the nonmagnetic conductive layer 55 is that first, ΔMR can be increased, and secondarily, diffusion with the nonmagnetic conductive layer 55 can be prevented.

Furthermore, a NiFe alloy film 58 is formed on the Co film 57, and the nonmagnetic intermediate layer 59 is formed on the NiFe alloy film 58. The second free magnetic layer 60 is formed on the nonmagnetic intermediate layer 59.

The second free magnetic layer 60 comprises a Co film, a NiFe alloy film, a CoFe alloy film, a CoNiFe alloy film, or the like.

The nonmagnetic intermediate layer 59 interposed between the first and second free magnetic layers 56 and 60 preferably comprises an alloy composed of at least one of Ru, Rh, Ir, Cr, Re, and Cu.

The magnetization directions of the first and second free magnetic layers 56 and 60 are brought into an antiparallel state (ferrimagnetic state) by an exchange coupling magnetic field (RKKY interaction) produced between the first and second free magnetic layers 56 and 60, as shown in FIGS. 10 and 11.

In the spin-valve thin film magnetic element shown in FIGS. 10 and 11, for example, the thickness $tF_1$ of the first free magnetic layer 56 is smaller than the thickness $tF_2$ of the second free magnetic layer 60.

Therefore, $Ms.tF_1$ of the first free magnetic layer 56 is set to be smaller than $Ms.tF_2$ of the second free magnetic layer 60 so that with a biased magnetic field applied from the bias layers 62 in the direction opposite to the X1 direction shown in the drawings, magnetization of the second free magnetic layer 60 having larger $Ms.tF_2$ is oriented in the direction opposite to the X1 direction by the influence of the biased magnetic field, while magnetization of the first free magnetic layer 56 having small $Ms.tF_2$ is oriented in the X1 direction by the exchange coupling magnetic field (RKKY interaction) with the second free magnetic layer 60.

When an external magnetic field enters in the Y direction, magnetizations of the first and second free magnetic layers 56 and 60 are rotated by the influence of the external magnetic field while maintaining the ferrimagnetic state. As a result, the electric resistance is changed with the relation between the variable magnetization of the first free magnetic layer 56, which contributes to ΔMR, and the pinned magnetization of the second pinned magnetic layer 54 (for example, magnetized in the direction opposite to the Y direction shown in the drawings) to detect the external magnetic field as a change in electric resistance.

Like the antiferromagnetic layer 51, the bias layers 62 are made of an alloy containing Mn and at least one element of Pt, Pd, Ir, Rh, Ru, Os, Au, Ag, Cr, Ni, Ne, Ar, Xe, and Kr.

The conductive layers 63 are preferably made of Au, W, Cr, Ta, or the like.

The spin-valve thin film magnetic element of this embodiment can be manufactured by substantially the same manufacturing method as the spin-valve thin film magnetic element shown in FIG. 1.

Namely, the method of manufacturing the spin-valve thin film magnetic element of the present invention comprises depositing in turn the antiferromagnetic layer 51, the first pinned magnetic layer 52, the nonmagnetic intermediate layer 53, the second pinned magnetic layer 54, the nonmagnetic conductive layer 55, the first free magnetic layer 56, the nonmagnetic intermediate layer 59, the second free magnetic layer 60, and the bias layers 62 on the substrate K to form the lamination, and then heat-treating the lamination at the first heat treatment temperature while applying the first magnetic field to the lamination in the direction perpendicular to the direction of the track width Tw to produce an exchange anisotropic magnetic field in each of the antiferromagnetic layer 51 and the bias layers 62 so that the magnetization directions of the first pinned magnetic layer 52 and the second free magnetic layer 60 are pinned in the same direction, and the exchange anisotropic magnetic field of the antiferromagnetic layer 51 is higher than that of the bias layers 62.

Then, the lamination is heat-treated at the second heat treatment temperature higher than the first heat treatment temperature with the second magnetic field applied in the direction of the track width Tw, which is higher than the exchange anisotropic magnetic field of the bias layers 62 and lower than that of the antiferromagnetic layer 51, to apply a biased magnetic field to the second free magnetic layer 60 in the direction perpendicular to the magnetization directions of the first and second pinned magnetic layers 52 and 54.

Then, a portion of the bias layers 62 of the heat-treated lamination is removed by ion milling to form a concave 62A having a width close to the track width Tw, and form a track groove 60A having a width corresponding to the track width Tw in a portion of the second free magnetic layer 60, which is located below the concave 62A.

Then, the conductive layers 63 are formed on the bias layers 62 by a method using lift off resist to obtain the spin-valve thin film magnetic element.

In the spin-valve thin film magnetic element, the second free magnetic layer 60 has a groove 60B comprising the track groove 60A having a width corresponding to the track width Tw on the side opposite to the pinned magnetic layer side (or the side opposite to the substrate K side), and thus the track width Tw can be precisely determined according to the width of the groove 60B.

In manufacturing the spin-valve thin film magnetic element, the bias layers 62 provided on the flat portions 60C of the second free magnetic layer 60 on both sides of the groove 60B are not left in the groove 60B, thereby providing the spin-valve thin film magnetic element with excellent sensitivity in which magnetic moment of the second free magnetic layer 60 is smoothly rotated with a weak leakage magnetic field from the magnetic recording medium.

In the spin-valve thin film magnetic element of this embodiment, since each of the antiferromagnetic layer 51 and the bias layers 62 is made of an alloy comprising Mn and at least one element of Pt, Pd, Rh, Ru, Ir, Os, Au, Ag, Cr, Ni, Ne, Ar, Xe, and Kr, the spin-valve thin film magnetic element has good temperature characteristics of an exchange anisotropic magnetic field, and excellent heat resistance.

When the spin-valve thin film magnetic element is provided in a thin film magnetic head in which the element is heated to high temperature due to the environmental temperature in a device such as a hard disk, and Joule heat of a sensing current flowing through the element, good durability is obtained, and an exchange anisotropic magnetic field (exchange coupling magnetic field) less changes with changes in temperature.

Furthermore, since the antiferromagnetic layer 51 is made of the above-described alloy, the blocking temperature is increased, and a high exchange anisotropic magnetic field can be produced in the antiferromagnetic layer 51 so that the magnetization directions of the first and second pinned magnetic layers 52 and 54 can be strongly pinned.

The method of manufacturing the spin-valve thin film magnetic element uses the alloy comprising Mn and at least one element of Pt, Pd, Rh, Ru, Ir, Os, Au, Ag, Cr, and Ni for each of the antiferromagnetic layer 51 and the bias layers 62, and employs the properties of the alloy to pin the magnetization directions of the first pinned magnetic layer 52 in the first heat treatment, and orient the magnetization direction of the second free magnetic layer 60 in the direction perpendicular to the magnetization directions of the first and second pinned magnetic layers 52 and 54 in the second heat treatment. Therefore, the magnetization direction of the second free magnetic layer 60 can be oriented in the direction perpendicular to the magnetization directions of the first and second pinned magnetic layers 52 and 54 without adversely affecting the magnetization direction of the first pinned magnetic layer 52, and the spin-valve thin film magnetic element having excellent heat treatment can be obtained.

The manufacturing method comprises depositing in turn the antiferromagnetic layer 51, the first pinned magnetic layer 52, the nonmagnetic intermediate layer 53, the second pinned magnetic layer 54, the nonmagnetic conductive layer 55, the first free magnetic layer 56, the nonmagnetic intermediate layer 59, the second free magnetic layer 60, and the bias layers 62 on the substrate to form the lamination, and then heat-treating the lamination. Therefore, in forming the lamination, the surface of each of the layers formed between the substrate K and the bias layers 62 is not exposed to air, and thus need not be cleaned by ion milling or reverse sputtering before upper layers are formed thereon apart from cases in which the surface of each of the layers is exposed to air. This can simplify the manufacturing method, and improve reproducibility. Since the surface of each of the layers need not be cleaned by ion milling or reverse sputtering, the manufacturing method is excellent because it causes no problem resulting from cleaning, such as contamination with materials adhering to the surfaces, the adverse affect of a disordered surface crystal state on the occurrence of an exchange anisotropic magnetic field, etc.

Furthermore, a portion of the bias layers 62 is removed to form the concave 62A having a width close to the track width Tw, and form the track groove 60A having a width corresponding to the track width Tw in the portion of the second free magnetic layer 60, which is located below the concave 62A. Therefore, even with variation in the thickness of the bias layers 62, the bias layers 62 are not left at the bottom 60D of the track groove 60A, and thus the track width Tw can be precisely defined, thereby obtaining the spin-valve thin film magnetic element adaptable to higher density recording. Since the bias layers 62 can easily completely be removed, the manufacture of the element can be facilitated.

Function of Sensing Current Magnetic Field

Description will now be made of the function of a sensing current magnetic field in the second and third embodiments shown in FIGS. 8 to 11.

In the spin-valve thin film magnetic element shown inn FIGS. 8 and 9, the second pinned magnetic layer 14 is formed below the nonmagnetic conductive layer 15. In this case, the direction of the sensing current magnetic field is oriented in the magnetization direction of one of the first and second pinned magnetic layers 12 and 14, which has higher magnetic moment.

As shown in FIG. 8, the magnetic moment of the second pinned magnetic layer 14 is higher than that of the first pinned magnetic layer 12, and is oriented in the direction (the leftward direction shown in the drawing) opposite to the Y direction shown in the drawing. Therefore, the synthetic magnetic moment obtained by adding up the magnetic moments of the first and second pinned magnetic layers 12 and 14 is oriented in the direction (the leftward direction shown in the drawing) opposite to the Y direction.

As described above, the nonmagnetic conductive layer 15 is formed above the second and first pinned magnetic layer 14 and 12. Therefore, the flow direction of a sensing current 112 may be controlled so that the sensing current magnetic field formed by the sensing current 112 mainly flowing in the nonmagnetic conductive layer 15 is oriented in the leftward direction below the nonmagnetic conductive layer 15. As a result, the direction of the synthetic magnetic moment of the first and second pinned magnetic layers 12 and 14 coincides with the direction of the sensing current magnetic field.

As shown in FIG. 8, the sensing current 112 is flowed in the X1 direction shown in the drawing. The sensing current magnetic field formed by flowing the sensing current is formed clockwise by the right-handed screw rule. Therefore, the sensing current magnetic field in the direction shown in the drawing (the direction opposite to the Y direction) is applied to the layers below the nonmagnetic conductive layer 15. This sensing current amplifies the exchange coupling magnetic field (RKKY interaction) exerting between the first and second pinned magnetic layers 12 and 14 in the direction to increase the synthetic magnetic moment, thereby thermally stabilizing the antiparallel state of magnetizations of the first and second pinned magnetic layers 12 and 14.

Particularly, it is found that flowing a sensing current of 1 mA causes a sensing magnetic field of about 30 (Oe), and increases the element temperature by about 10° C. The rotational speed of the recording medium is also increased to about 10000 rpm to increase the temperature in the device to about 100° C. at most. Therefore, for example, flowing a sensing current of 10 mA increases the temperature of the spin-valve thin film element to about 200° C., and the sensing magnetic field to 300 (Oe).

Under such a high environmental temperature and a high sensing current flowing, if the synthetic magnetic moment obtained by adding up the magnetic moments of the first and second pinned magnetic layers 12 and 14 is opposite to the direction of the sensing current magnetic field, the antiparallel magnetization state of the first and second pinned magnetic layers 12 and 14 is readily broken.

In order to make the element proof against high environmental temperatures, it is necessary to not only control the direction of the sensing current magnetic field but also use an antiferromagnetic material having a high blocking temperature for the antiferromagnetic layer 11. Therefore, the present invention uses the above alloy having a high blocking temperature.

Where the synthetic magnetic moment formed by the magnetic moments of the first and second pinned magnetic layers 12 and 14 shown in FIG. 8 is oriented in the rightward direction shown in the drawing (the Y direction shown in the drawing), the sensing current is preferably flowed in the direction opposite to the X1 direction to form the sensing current magnetic field counterclockwise in the drawing.

FIGS. 10 and 11 the spin-valve thin film magnetic element of the third embodiment in which the free magnetic layer is divided into two layers including the first and second free magnetic layers with the nonmagnetic intermediate layer provided therebetween. However, in the spin-valve thin film magnetic element shown in FIG. 10 in which the first and second pinned magnetic layers 52 and 54 are formed below the nonmagnetic conductive layer 55, the direction of the sensing current is preferably controlled in the same manner as the spin-valve thin film magnetic element shown in FIG. 8.

As described above, in each of the above embodiments, the direction of the sensing current magnetic field formed by flowing the sensing current is caused to coincide with the direction of the synthetic magnetic moment obtained by adding up the magnetic moments of the first and second pinned magnetic layers to amplify the exchange coupling magnetic field (RKKY interaction) exerting between the first and second pinned magnetic layers, thereby maintaining the antiparallel magnetization state (ferrimagnetic state) of the first and second pinned magnetic layers in a thermally stable state.

Particularly, in the embodiments, in order to further improve thermal stability, an antiferromagnetic material having a high blocking temperature is used for the antiferromagnetic layer. Therefore, even when the environmental temperature is significantly increased as compared with conventional elements, the antiparallel magnetization state (ferrimagnetic state) of the first and second magnetic layers can be made resistant to high temperatures.

In order to comply with high-density recording, an attempt is made to increase the amount of the sensing current to increase reproduction output, thereby increasing the sensing current magnetic field. However, in the embodiments of the present invention, the sensing current magnetic field has the function to amplify the exchange coupling magnetic field exerting between the first and second pinned magnetic layers, and thus the magnetization state of the first and second pinned magnetic layers is further stabilized by increasing the sensing current magnetic field.

The direction control of the sensing current can also be applied to cases in which any antiferromagnetic material is used for the antiferromagnetic layer. For example, the control is performed regardless of whether or not heat treatment is required for producing the exchange coupling magnetic field (exchange anisotropic magnetic field) in the interface between the antiferromagnetic layer and the pinned magnetic layer (the first pinned magnetic layer).

Like in the first embodiment shown in FIG. 1, even in a spin-valve thin film magnetic element comprising a pinned magnetic layer comprising a single layer, the direction of the sensing current magnetic field formed by flowing the sensing current can be caused to coincide with the magnetization direction of the pinned magnetic layer, thereby thermally stabilizing magnetization of the pinned magnetic layer.

As described in detail above, the spin-valve thin film magnetic element of the present invention comprises the pinned magnetic layer having a groove comprising a track groove having a width corresponding to the track width Tw, which is formed on the side opposite to the substrate side, and thus the track width can be precisely determined according to the width of the groove.

In manufacturing the spin-valve thin film magnetic element, the bias layers provided on the flat portions of the free magnetic layer on both sides of the groove is not left in the groove, thereby providing the spin-valve thin film magnetic element with excellent sensitivity in which magnetic moment of the free magnetic layer is smoothly rotated with a weak leakage magnetic field from the magnetic recording medium.

In the spin-valve thin film magnetic element of the present invention, since each of the antiferromagnetic layer and the bias layers is made of an alloy comprising Mn and at least one element of Pt, Pd, Rh, Ru, Ir, Os, Au, Ag, Cr, Ni, Ne, Ar, Xe, and Kr, the spin-valve thin film magnetic element has good temperature characteristics of an exchange anisotropic magnetic field, and excellent heat resistance.

When the spin-valve thin film magnetic element is provided in a thin film magnetic head in which the element is heated to high temperature due to the environmental temperature in a device such as a hard disk, and Joule heat of a current flowing through the element, good durability is obtained, and an exchange anisotropic magnetic field (exchange coupling magnetic field) less changes with changes in temperature.

Furthermore, since the antiferromagnetic layer is made of the above-described alloy, the blocking temperature is increased, and a high exchange anisotropic magnetic field can be produced in the antiferromagnetic layer so that the magnetization direction the pinned magnetic layer can be strongly pinned.

In the spin-valve thin film magnetic element, at least one of the pinned magnetic layer and the free magnetic layer may be divided into two layers with a nonmagnetic intermediate layer provided therebetween so that the magnetization directions of the divided layers are brought into the ferrimagnetic state in which the directions are 180° different.

In the spin-valve thin film magnetic element in which at least the pinned magnetic layer is divided into two layers with a nonmagnetic intermediate layer provided therebetween, one of the two divided pinned magnetic layers functions to pin the other pinned magnetic layer in a proper direction, thereby maintaining the pinned magnetic layer in a very stable state.

On the other hand, in the spin-valve thin film magnetic element in which at least the free magnetic layer is divided into two layers with a nonmagnetic intermediate layer provided therebetween, an exchange coupling magnetic field is produced between the two divided free magnetic layers to cause the ferrimagnetic state, thereby permitting reversal with high sensitivity to an external magnetic field.

The method of manufacturing the spin-valve thin film magnetic element of the present invention uses the alloy comprising Mn and at least one element of Pt, Pd, Rh, Ru, Ir, Os, Au, Ag, Cr, Ni, Ne, Ar, Kr, and Xe for each of the antiferromagnetic layer and the bias layers, and employs the properties of the alloy to pin the magnetization direction of the pinned magnetic layer in the first heat treatment, and orient the magnetization direction of the free magnetic layer in the direction perpendicular to the magnetization direction of the pinned magnetic layer in the second heat treatment. Therefore, the magnetization direction of the free magnetic layer can be oriented in the direction perpendicular to the magnetization direction the pinned magnetic layer without adversely affecting the magnetization direction of the pinned magnetic layer, and the spin-valve thin film magnetic element having excellent heat treatment can be obtained.

The manufacturing method comprises depositing in turn the antiferromagnetic layer, the pinned magnetic layer, the nonmagnetic conductive layer, the free magnetic layer, and the bias layers on the substrate to form the lamination, and then heat-treating the lamination. Therefore, in forming the lamination, the surface of each of the layers formed between the substrate and the bias layers is not exposed to air, and thus need not be cleaned by ion milling or reverse sputtering before upper layers are formed thereon apart from cases in which the surface of each of the layers is exposed to air. This can simplify the manufacturing method, and improve reproducibility. Since the surface of each of the layers need not be cleaned by ion milling or reverse sputtering, the manufacturing method is excellent because it causes no problem resulting from cleaning, such as contamination with materials adhering to the surfaces, the adverse affect of a disordered surface crystal state on the occurrence of an exchange anisotropic magnetic field, etc.

Furthermore, in the method of manufacturing the spin-valve thin film magnetic element, a portion of the bias layers is removed to form the concave having a width close to the track width Tw, and form the track groove having a width corresponding to the track width Tw in the portion of the free magnetic layer, which is located below the concave. Therefore, even with variation in the thickness of the bias layers, the bias layers are not left at the bottom of the track groove, and thus the track width Tw can be precisely defined, thereby obtaining the spin-valve thin film magnetic element adaptable to higher density recording. Since the bias layers can easily completely be removed, the manufacture of the element can be facilitated.

Since the thin film magnetic head of the present invention comprises the above-described spin-valve thin film magnetic element provided on a slider, the thin film magnetic head has excellent durability and heat resistance, and produces a sufficient exchange anisotropic magnetic field.

While the invention has been described and illustrated, this description is by way of example only. Additional advantages will occur readily to those skilled in the art, who may make numerous changes without departing from the true spirit and scope of the invention. Therefore, the invention is not limited to the specific details, representative devices, and illustrated examples in this description. Accordingly, the scope of this invention is to be limited only as necessitated by the accompanying claims.

What is claimed is:

1. A spin-valve thin film magnetic element, comprising:

a pinned magnetic layer having a pinned magnetization direction;

a nonmagnetic conductive layer operatively connected to the pinned magnetic layer;

a free magnetic layer having a bottom and a top, the bottom operatively connected to the nonconductive layer, the top forming a track groove between a first flat portion and a second flat portion, the free magnetic layer having a free magnetization direction;

a first bias layer operatively connected to the first flat portion; and a second bias layer operatively connected to the second flat portion, wherein the first and second bias layers orient the free magnetization direction in a direction perpendicular to the pinned magnetization direction.

2. A spin-valve thin film magnetic element according to claim 1, wherein the first and second bias layers remain outside the track groove.

3. A spin-valve thin film magnetic element according to claim 1, wherein the track groove has a depth within a range of 10 to 50 μm.

4. A spin-valve thin film magnetic element according to claim 1, wherein the first and second bias layers define a track width, the track groove having a width corresponding to the track width.

5. A spin-valve thin film magnetic element according to claim 1, further comprising an antiferromagnetic layer operatively connected to the pinned magnetic layer, wherein the pinned magnetization direction is pinned by an exchange anisotropic magnetic field with the antiferromagnetic layer.

6. A spin-valve thin film magnetic element according to claim 5, wherein each of the antiferromagnetic layer and the first and second bias layers is composed of an alloy containing Mn, and at least one element of Pt, Pd, Rh, Ru, Ir, Os, Au, Ag, Cr, Ni, Ne, Ar, Xe, and Kr.

7. A spin-valve thin film magnetic element according to claim 5, wherein the antiferromagnetic layer is made of an alloy represented by the following composition formula:

$$X_m Mn_{100-m}$$

wherein X is at least one element of Pt, Pd, Rh, Ru, Ir, and Os, and the composition ratio m satisfies 48 atomic %≦m≦60 atomic %.

8. A spin-valve thin film magnetic element according to claim 5, wherein the antiferromagnetic layer is made of an alloy represented by the following composition formula:

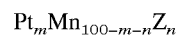

$$Pt_m Mn_{100-m-n} Z_n$$

wherein Z is at least one element of Pd, Rh, Ru, Ir, and Os, and the composition ratios m and n satisfy 48 atomic %≦m+n≦60 atomic %, and 0.2 atomic %≦n≦40 atomic %.

9. A spin-valve thin film magnetic element according to claim 5, wherein the antiferromagnetic layer is made of an alloy represented by the following composition formula:

$$Pt_qMn_{100-q-j}L_j$$

wherein L is at least one element of Au, Ag, Cr, Ni, Ne, Ar, Xe, and Kr, and the composition ratios q and j satisfy 48 atomic $\% \leq q+j \leq 60$ atomic %, and 0.2 atomic $\% \leq j \leq 10$ atomic %.

10. A spin-valve thin film magnetic element according to claim 1, further comprising:
a first conductive layer operatively connected on the first bias layer; and
a second conductive layer operatively connected on the second bias layer,
wherein the first and second conductive layers supply a sensing current to the free magnetic layer.

11. A spin-valve thin film magnetic element according to claim 1, wherein the first and second bias layers are composed of an alloy containing Mn, and at least one element of Pt, Pd, Rh, Ru, Ir, Os, Au, Ag, Cr, Ni, Ne, Ar, Xe, and Kr.

12. A spin-valve thin film magnetic element according to claim 1, further comprising a nonmagnetic intermediate layer dividing at least one of the pinned magnetic layer and the free magnetic layer into first and second divided magnetic layers, wherein the first and second divided magnetic layers have a ferrimagnetic state in which the magnetization direction of the first divided magnetic layer is 180° from the magnetization direction of the second divided magnetic layer.

13. A spin-valve thin film magnetic element according to claim 1, wherein the bias layers are made of an alloy represented by the following composition formula:

$$X_mMn_{100-m}$$

wherein X is at least one element of Pt, Pd, Rh, Ru, Ir, and Os, and the composition ratio m satisfies 52 atomic $\% \leq m \leq 60$ atomic %.

14. A spin-valve thin film magnetic element according to claim 1, wherein the bias layers are made of an alloy represented by the following composition formula:

$$Pt_mMn_{100-m-n}Z_n$$

wherein Z is at least one element of Pd, Rh, Ru, Ir, and Os, and the composition ratios m and n satisfy 52 atomic $\% \leq m+n \leq 60$ atomic %, and 0.2 atomic $\% \leq n \leq 40$ atomic %.

15. A spin-valve thin film magnetic element according to claim 1, wherein the bias layers are made of an alloy represented by the following composition formula:

$$Pt_qMn_{100-q-j}L_j$$

wherein L is at least one element of Au, Ag, Cr, Ni, Ne, Ar, Xe, and Kr, and composition ratios q and j satisfy 52 atomic $\% \leq q+j \leq 60$ atomic %, and 0.2 atomic $\% \leq j \leq 10$ atomic %.

16. A spin-valve thin film magnetic element comprising;
an antiferromagnetic layer;
a pinned magnetic layer formed in contact with the antiferromagnetic layer, the pinned magnetic layer having a pinned magnetization direction, wherein the pinned magnetization direction is pinned by an exchange anisotropic magnetic field with the antiferromagnetic layer;
a nonmagnetic conductive layer formed in contact with the pinned magnetic layer;
a free magnetic layer formed in contact with the nonmagnetic conductive layer the free magnetic layer having a free magnetization direction;
bias layers formed in contact with the free magnetic layer, wherein the bias layers orient the free magnetization direction in a direction perpendicular to the pinned magnetization direction; and
conductive layers formed in contact with the bias layers, the conductive layers for supplying a sensing current to the free magnetic layer,
wherein the free magnetic layer defines a track groove on a side opposite to the pinned magnetic layer, the track groove having a width corresponding to the track width, the free magnetic layer further defining flat portions adjacent to the groove, and
wherein the bias layers are formed on the flat portions of the free magnetic layer.

17. A spin-valve thin film magnetic element according to claim 16, wherein the bias layers remain outside the track groove.

18. A spin-valve thin film magnetic element according to claim 16, wherein the track groove has a depth within a range of 10 to 50 μm.

19. A spin-valve thin film magnetic element according to claim 16, wherein each of the antiferromagnetic layer and the bias layers is composed of an alloy containing Mn, and at least one element of Pt, Pd, Rh, Ru, Ir, Os, Au, Ag, Cr, Ni, Ne, Ar, Xe, and Kr.

20. A spin-valve thin film magnetic element according to claim 16, further comprising a nonmagnetic intermediate layer dividing at least one of the pinned magnetic layer and the free magnetic layer into first and second divided magnetic layers, wherein the divided magnetic layers have a ferrimagnetic state in which the magnetization directions of the divided magnetic layers are 180° different.

21. A spin-valve thin film magnetic element according to claim 16, wherein the antiferromagnetic layer is made of an alloy represented by the following composition formula:

$$X_mMn_{100-m}$$

wherein X is at least one element of Pt, Pd, Rh, Ru, Ir, and Os, and the composition ratio m satisfies 48 atomic $\% \leq m \leq 60$ atomic %.

22. A spin-valve thin film magnetic element according to claim 16, wherein the bias layers are made of an alloy represented by the following composition formula:

$$X_mMn_{100-m}$$

wherein X is at least one element of Pt, Pd, Rh, Ru, Ir, and Os, and the composition ratio m satisfies 52 atomic $\% \leq m \leq 60$ atomic %.

23. A spin-valve thin film magnetic element according to claim 16, wherein the antiferromagnetic layer is made of an alloy represented by the following composition formula:

$$Pt_mMn_{100-m-n}Z_n$$

wherein Z is at least one element of Pd, Rh, Ru, Ir, and Os, and the composition ratios m and n satisfy 48 atomic $\% \leq m+n \leq 60$ atomic %, and 0.2 atomic $\% \leq n \leq 40$ atomic %.

24. A spin-valve thin film magnetic element according to claim 16, wherein the bias layers are made of an alloy represented by the following composition formula:

$$Pt_mMn_{100-m-n}Z_n$$

wherein Z is at least one element of Pd, Rh, Ru, Ir, and Os, and the composition ratios m and n satisfy 52 atomic $\% \leq m+n \leq 60$ atomic %, and 0.2 atomic $\% \leq n \leq 40$ atomic %.

25. A spin-valve thin film magnetic element according to claim 16, wherein the antiferromagnetic layer is made of an alloy represented by the following composition formula:

$$Pt_qMn_{100-q-j}L_j$$

wherein L is at least one element of Au, Ag, Cr, Ni, Ne, Ar, Xe, and Kr, and the composition ratios q and j satisfy 48 atomic % $\leq$ q+j $\leq$ 60 atomic %, and 0.2 atomic % $\leq$ j $\leq$ 10 atomic %.

26. A spin-valve thin film magnetic element according to claim 16, wherein the bias layers are made of an alloy represented by the following composition formula:

$$Pt_qMn_{100-q-j}L_j$$

wherein L is at least one element of Au, Ag, Cr, Ni, Ne, Ar, Xe, and Kr, and composition ratios q and j satisfy 52 atomic % $\leq$ q+j $\leq$ 60 atomic %, and 0.2 atomic % $\leq$ j $\leq$ 10 atomic %.

* * * * *